Figure 1:
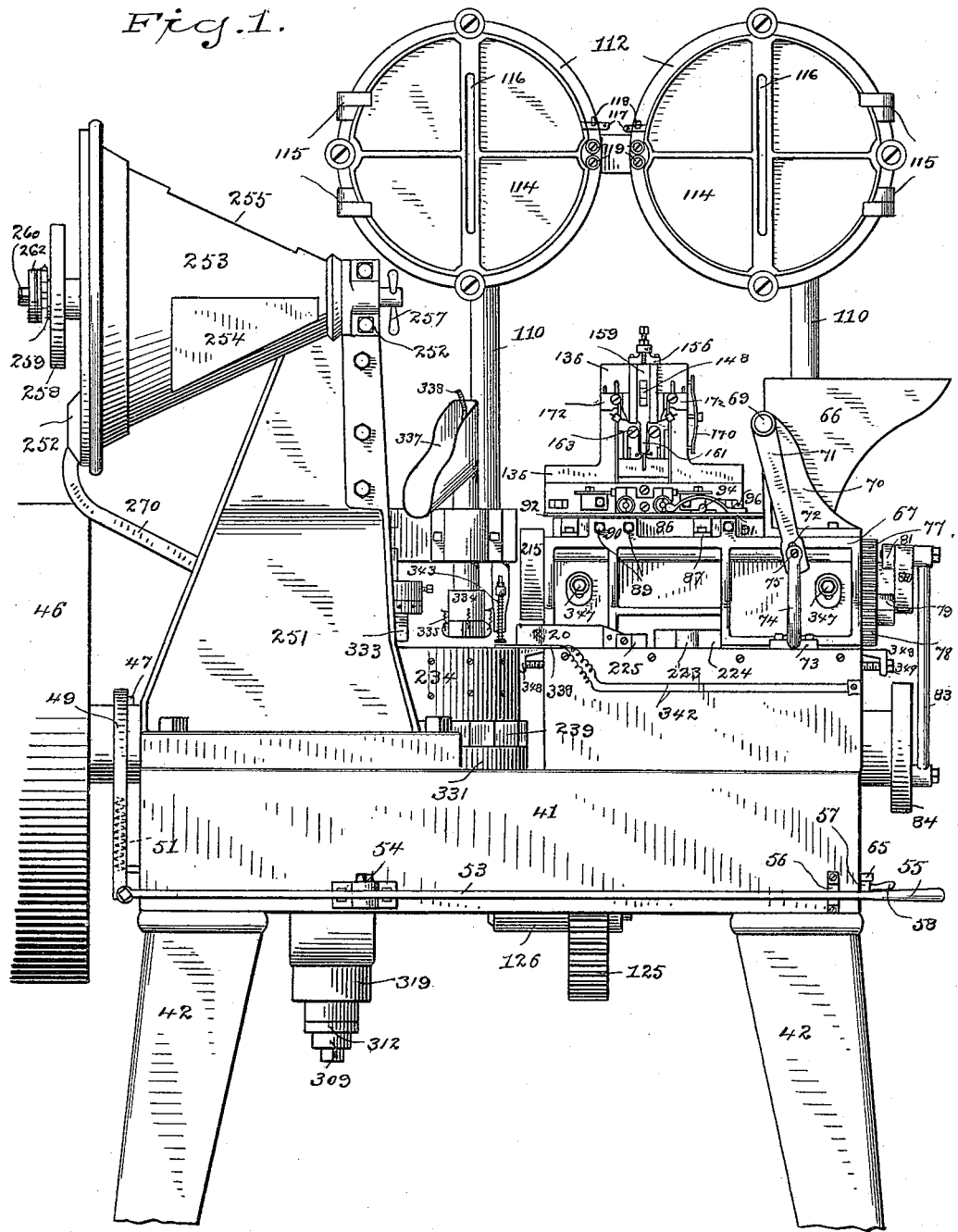

No. 635,072. Patented Oct. 17, 1899.
H. J. HURD.
MACHINE FOR MAKING PAPER CARTRIDGE SHELLS.
(Application filed May 15, 1899.)
(No Model.) 15 Sheets—Sheet 1.

WITNESSES
H. A. Lamb
N. Elwood

INVENTOR
Hobert J. Hurd
By A. M. Wooster
Atty.

No. 635,072. Patented Oct. 17, 1899.
H. J. HURD.
MACHINE FOR MAKING PAPER CARTRIDGE SHELLS.
(Application filed May 15, 1899.)
(No Model.) 15 Sheets—Sheet 2.

WITNESSES
H. H. Lamb
N. Elwood

INVENTOR
Hobert J. Hurd
By A. M. Wooster
Atty.

No. 635,072. Patented Oct. 17, 1899.
H. J. HURD.
MACHINE FOR MAKING PAPER CARTRIDGE SHELLS.
(Application filed May 15, 1899.)
(No Model.) 15 Sheets—Sheet 3.

WITNESSES
H. A. Lamb
N. Elwood

INVENTOR
Hobert J. Hurd
By A. M. Wooster
Atty.

No. 635,072. Patented Oct. 17, 1899.
H. J. HURD.
MACHINE FOR MAKING PAPER CARTRIDGE SHELLS.
(Application filed May 15, 1899.)
(No Model.) 15 Sheets—Sheet 5.

WITNESSES
H. A. Lamb
N. Elwood

INVENTOR
Hobert J. Hurd
By
A. M. Wooster
Atty.

No. 635,072. Patented Oct. 17, 1899.
H. J. HURD.
MACHINE FOR MAKING PAPER CARTRIDGE SHELLS.
(Application filed May 15, 1899.)
(No Model.) 15 Sheets—Sheet 6.

WITNESSES
H. A. Lamb
N. Elwood

INVENTOR
Hobert J. Hurd
By A. Wooster
Atty.

No. 635,072. Patented Oct. 17, 1899.
H. J. HURD.
MACHINE FOR MAKING PAPER CARTRIDGE SHELLS.
(Application filed May 15, 1899.)
(No Model.) 15 Sheets—Sheet 7.

WITNESSES
H. A. Lamb
N. Elwood

INVENTOR
Hobert J. Hurd
By A. M. Wooster
Atty.

No. 635,072. Patented Oct. 17, 1899.
H. J. HURD.
MACHINE FOR MAKING PAPER CARTRIDGE SHELLS.
(Application filed May 15, 1899.)
(No Model.) 15 Sheets—Sheet 8.
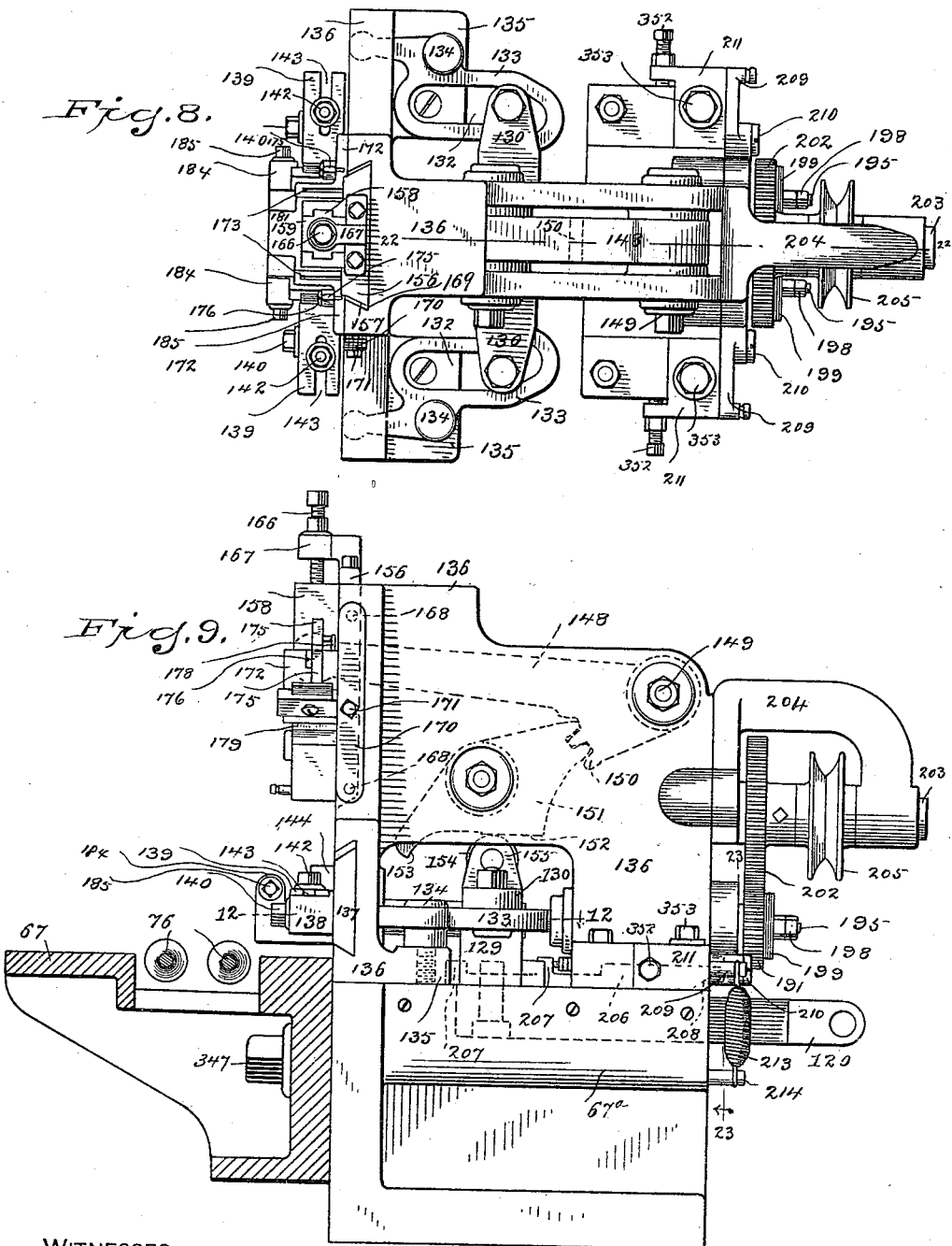
WITNESSES
H. A. Lamb
N. Elwood.
INVENTOR
Hobert J. Hurd
By A. M. Wooster
Atty.

No. 635,072. Patented Oct. 17, 1899.
H. J. HURD.
MACHINE FOR MAKING PAPER CARTRIDGE SHELLS.
(Application filed May 15, 1899.)
(No Model.) 15 Sheets—Sheet 9.

WITNESSES
H. A. Lamb
N. Elwood

INVENTOR
Hobert J. Hurd
By A. M. Wooster
Atty.

No. 635,072. Patented Oct. 17, 1899.
H. J. HURD.
MACHINE FOR MAKING PAPER CARTRIDGE SHELLS.
(Application filed May 15, 1899.)

(No Model.) 15 Sheets—Sheet 10.

WITNESSES
H. A. Lamly
N. Elwood

INVENTOR
Hobert J. Hurd
By A. M. Wooster
Atty.

No. 635,072. Patented Oct. 17, 1899.
H. J. HURD.
MACHINE FOR MAKING PAPER CARTRIDGE SHELLS.
(Application filed May 15, 1899.)
(No Model.) 15 Sheets—Sheet 11.
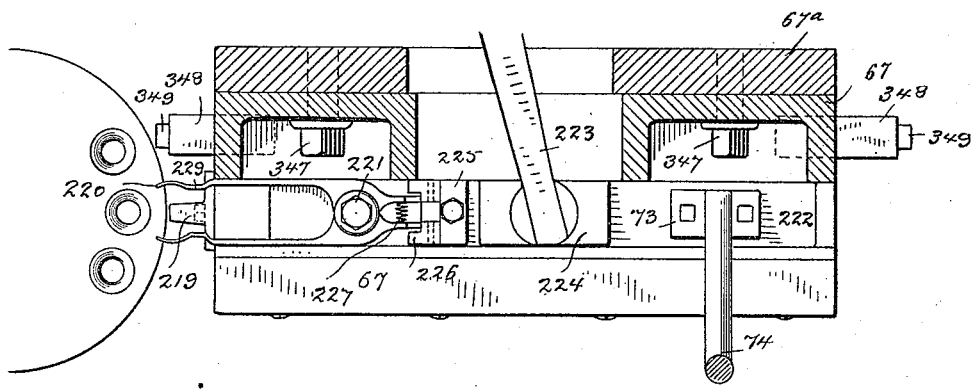
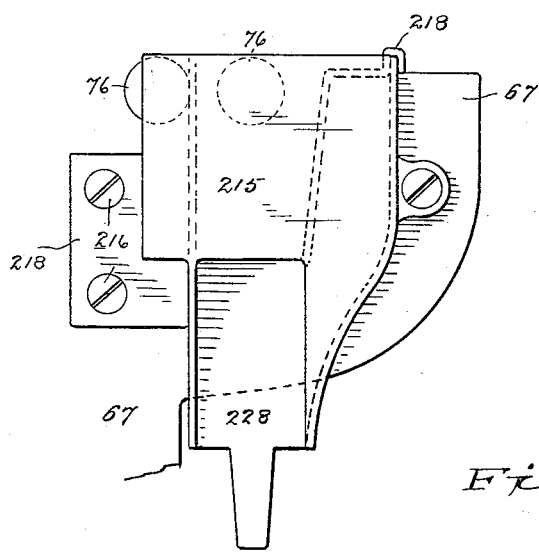
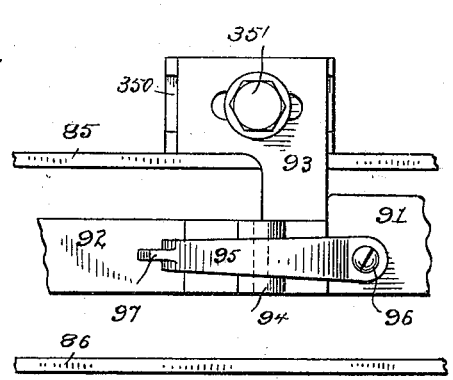
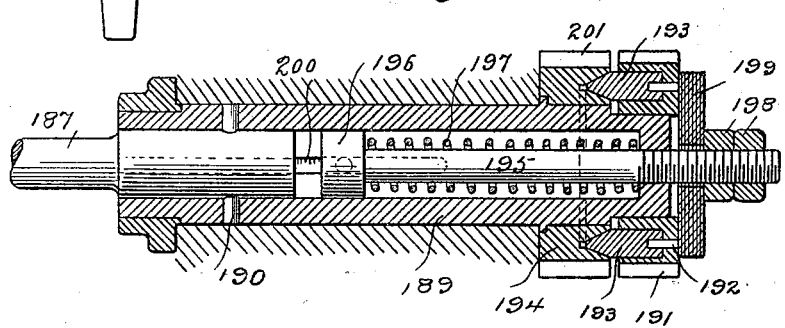
WITNESSES
H. A. Lantz
N. Elwood.
INVENTOR
Hobert J. Hurd
By A. M. Wooster
Atty.

No. 635,072. Patented Oct. 17, 1899.
H. J. HURD.
MACHINE FOR MAKING PAPER CARTRIDGE SHELLS.
(Application filed May 15, 1899.)

(No Model.) 15 Sheets—Sheet 12.

WITNESSES
H. A. Lamb
N. Elwood

INVENTOR
Hobert J. Hurd
By A. M. Wooster
Atty.

No. 635,072. Patented Oct. 17, 1899.
H. J. HURD.
MACHINE FOR MAKING PAPER CARTRIDGE SHELLS.
(Application filed May 15, 1899.)
(No Model.) 15 Sheets—Sheet 13.

WITNESSES
H. A. Lamb
N. Elwood.

INVENTOR
Hobert J. Hurd
By A. M. Wooster
Atty.

No. 635,072. Patented Oct. 17, 1899.
H. J. HURD.
MACHINE FOR MAKING PAPER CARTRIDGE SHELLS.
(Application filed May 15, 1899.)

(No Model.) 15 Sheets—Sheet 14.

WITNESSES
H. A. Lamb
W. Elwood.

INVENTOR
Hobert J. Hurd
By A. M. Wooster
Atty.

No. 635,072. Patented Oct. 17, 1899.
H. J. HURD.
MACHINE FOR MAKING PAPER CARTRIDGE SHELLS.
(Application filed May 15, 1899.)

(No Model.) 15 Sheets—Sheet 15.

WITNESSES
H. A. Lamb.
N. Elwood.

INVENTOR
Hobert J. Hurd
By A. M. Wooster
Atty.

THE NORRIS PETERS CO., PHOTO-LITHO., WASHINGTON, D. C.

UNITED STATES PATENT OFFICE.

HOBERT J. HURD, OF BRIDGEPORT, CONNECTICUT, ASSIGNOR TO THE UNION METALLIC CARTRIDGE COMPANY, OF SAME PLACE.

MACHINE FOR MAKING PAPER CARTRIDGE-SHELLS.

SPECIFICATION forming part of Letters Patent No. 635,072, dated October 17, 1899.

Application filed May 15, 1899. Serial No. 716,816. (No model.)

*To all whom it may concern:*

Be it known that I, HOBERT J. HURD, a citizen of the United States, residing at Bridgeport, county of Fairfield, State of Connecticut, have invented a new and useful Machine for Making Paper Cartridge-Shells, of which the following is a specification.

This invention relates to machines for making cartridge-shells, particularly those for use in shotguns and composed of paper cylinders having metallic caps; and the principal object of the invention is the production of a machine which will automatically spread the ends of the paper tubes, form and insert the wads, pinch or contract the wadded ends of the tubes, spread the ends of the metallic caps, unite the caps and wadded tubes, and, finally, restore the spread ends of the caps to cylindrical shape and discharge the finished shells. Other objects incidental to the foregoing will be apparent in connection with the following description.

To these ends the invention consists in mechanism for forming and inserting the wads while the tubes are held in one position, such as the horizontal, mechanism for applying caps to the tubes while held in another position, such as the vertical, and means for feeding the tubes from one to the other and for changing their positions while in transit from one to the other.

The invention further consists in features of construction and in combinations of parts, as will be hereinafter described and claimed.

In carrying out this invention much of an old and well-known form of dial capping mechanism is employed for applying the caps to the paper tubes, the changes therein being minor ones, mainly due to the combination therewith of my novel arrangement and construction of means for wadding the tubes. In addition to providing the latter I have produced a novel secondary feed for automatically transferring the tubes from the wadding mechanism to the said generally-old form of capping mechanism, and in connection with all these devices and mechanisms I have provided means for automatically stopping the machine upon the failure of any supply or other error in production.

Figure 3:
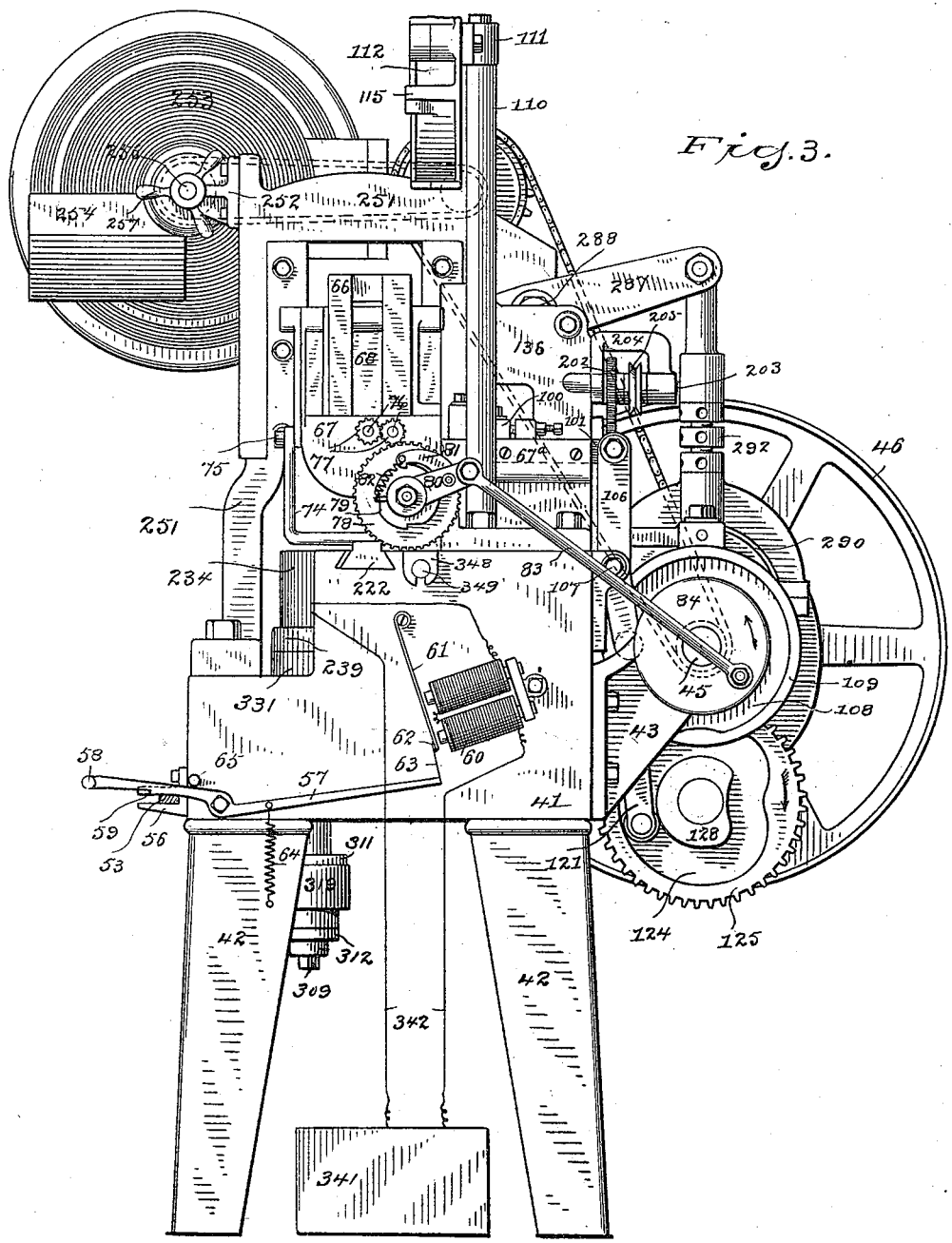
Figure 4:
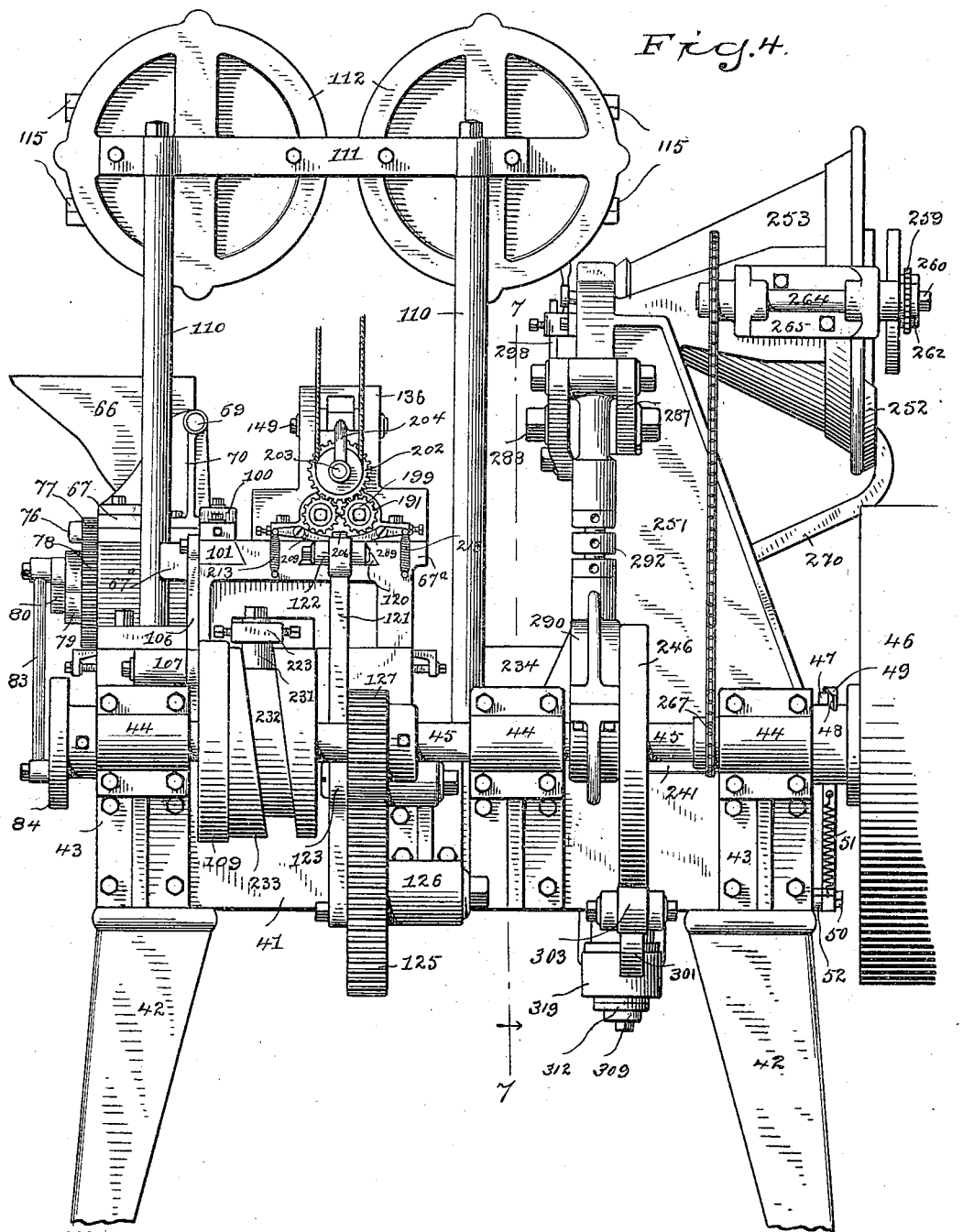
Figure 5:
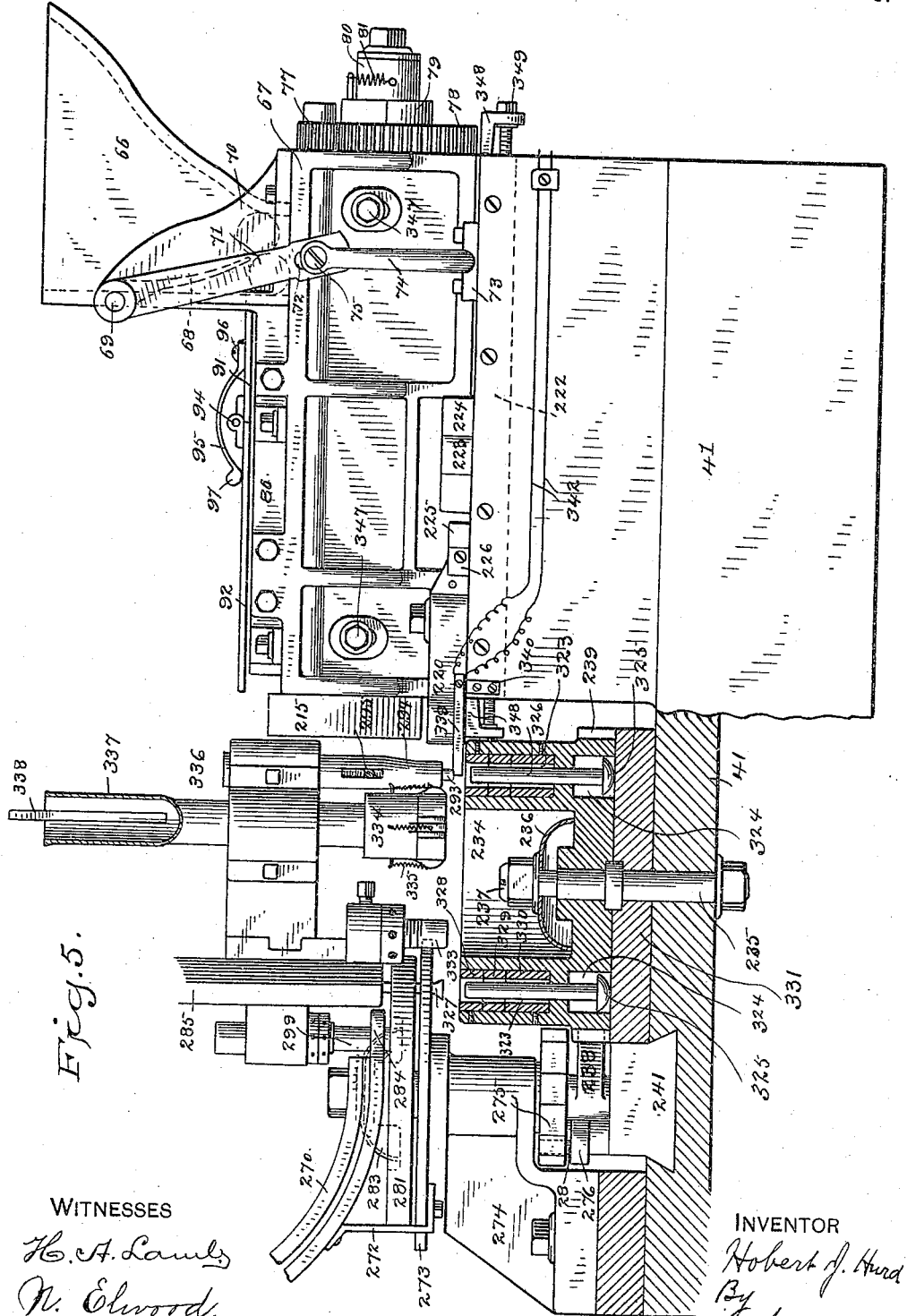
Figure 6:
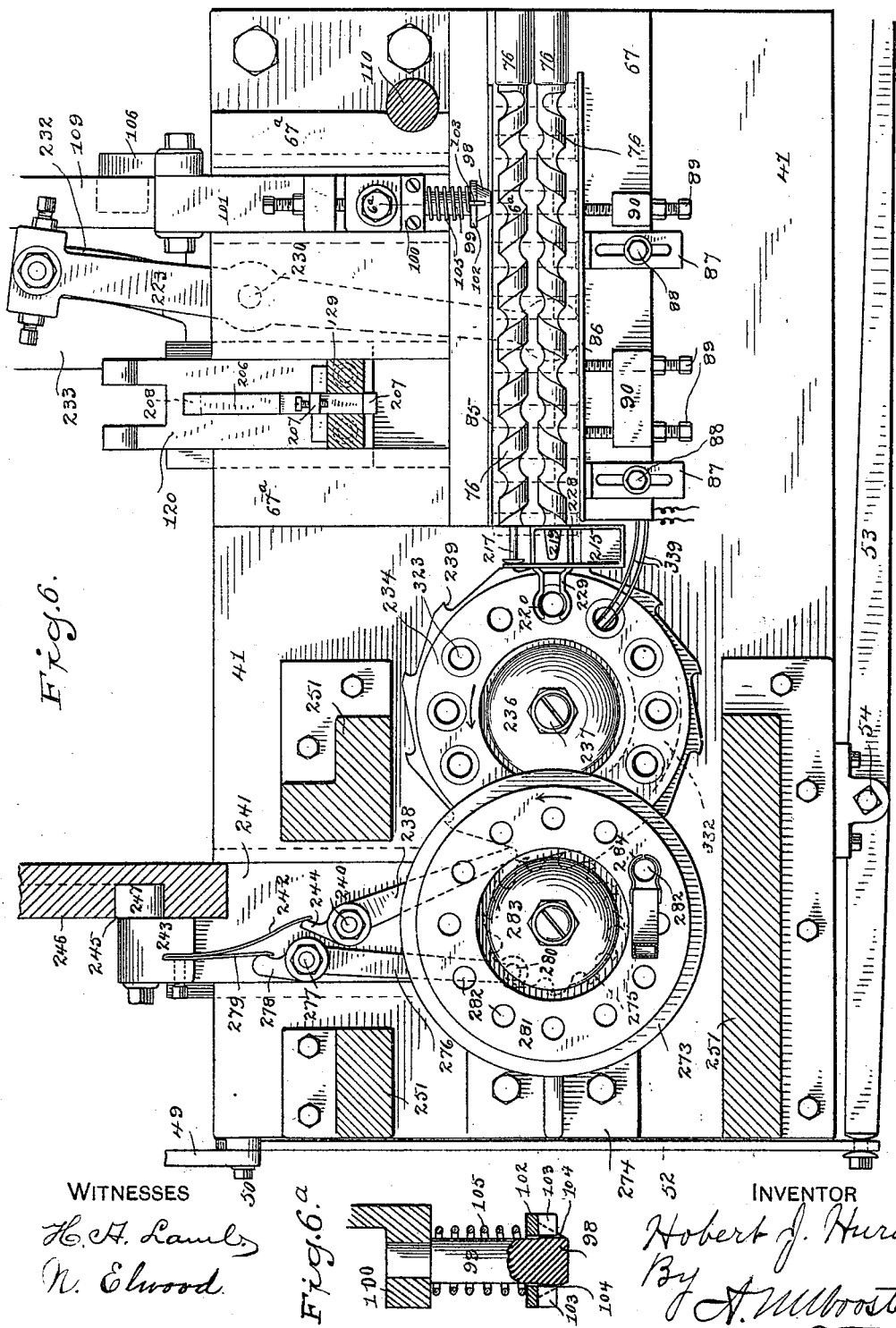
Figure 7:
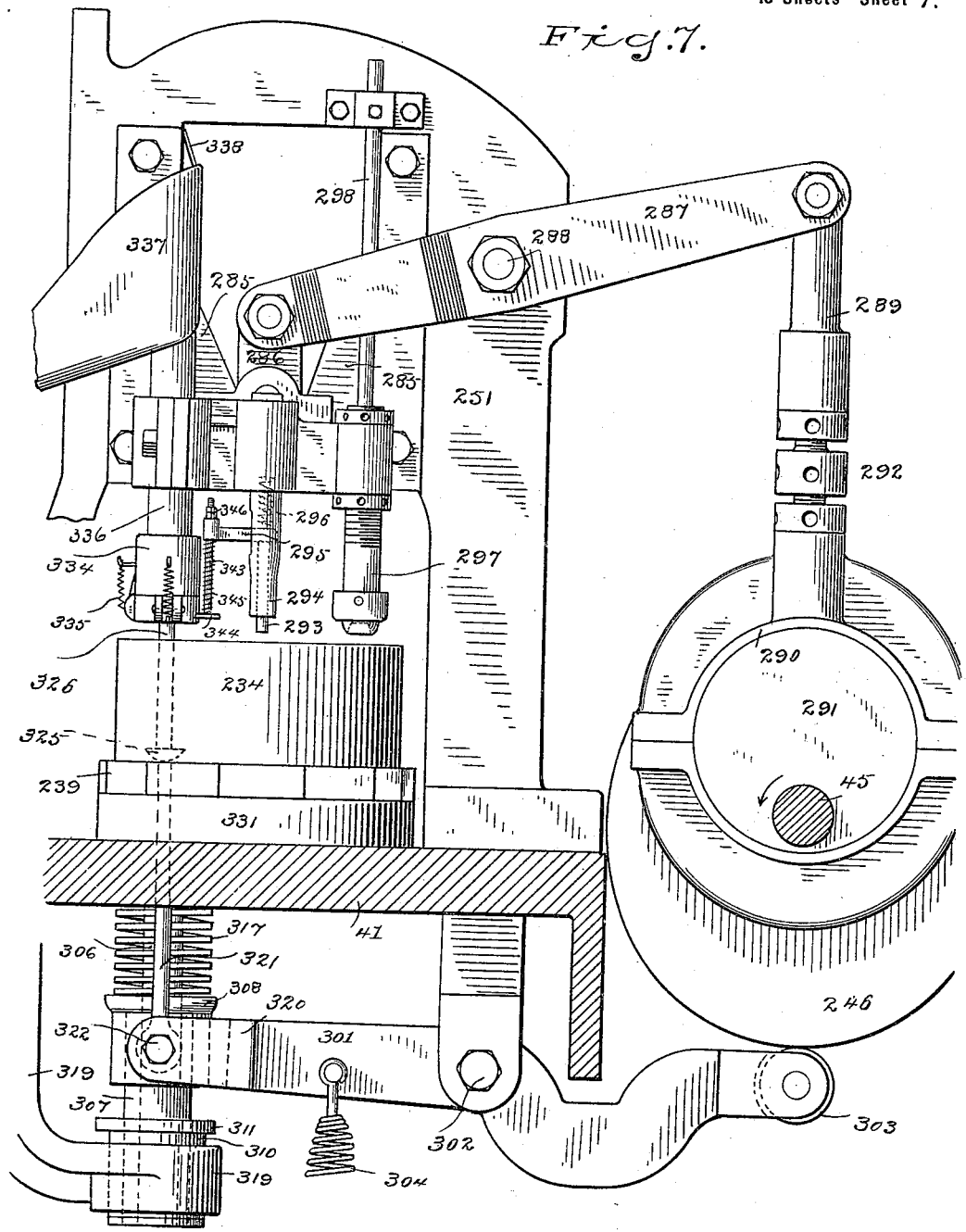
Figure 10:
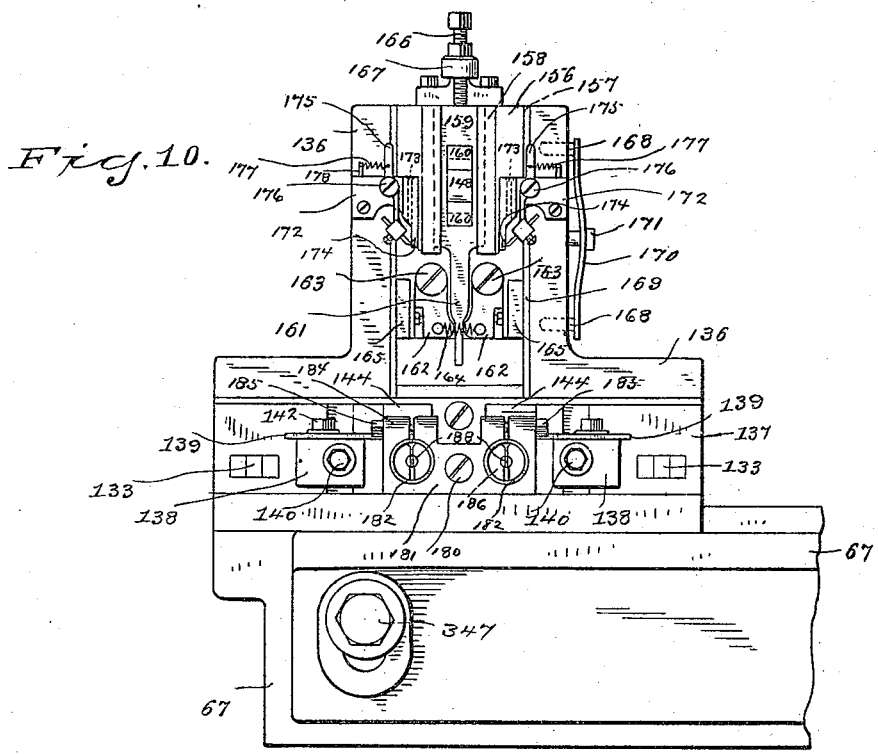
Figure 11:
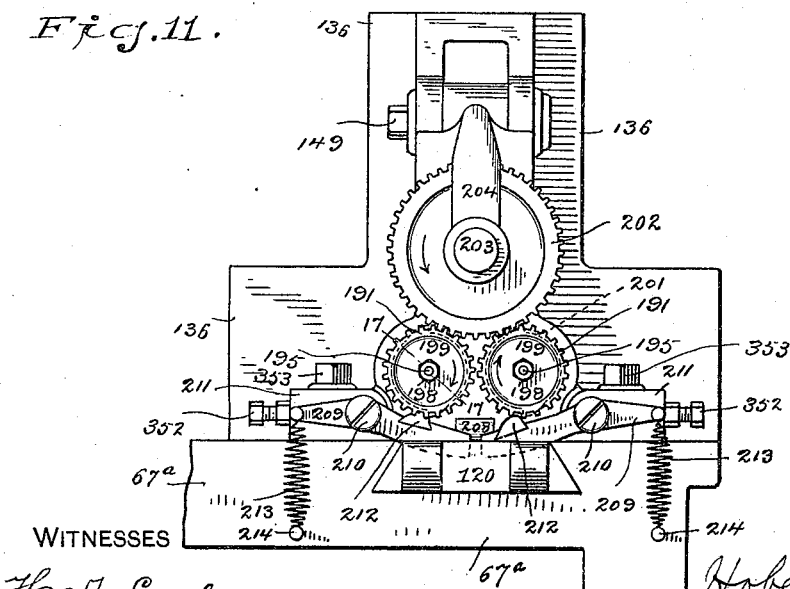
Figure 13:
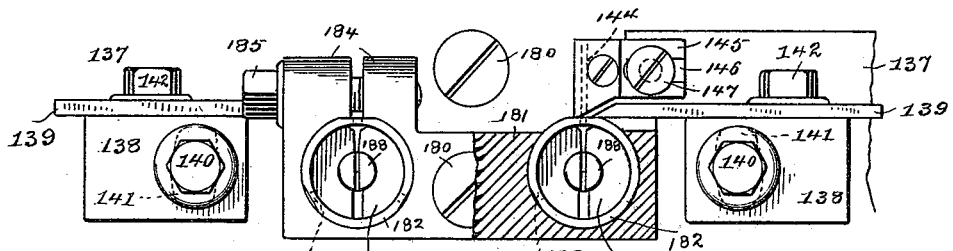
Figure 12:
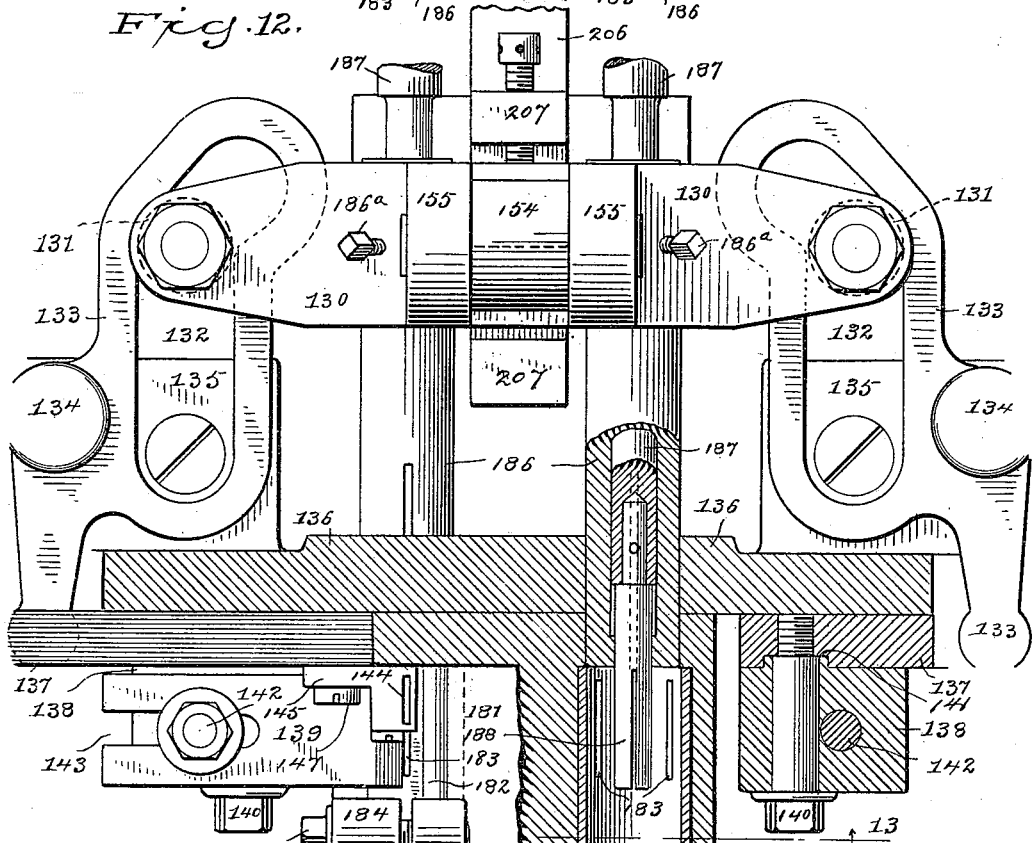
Figure 18:
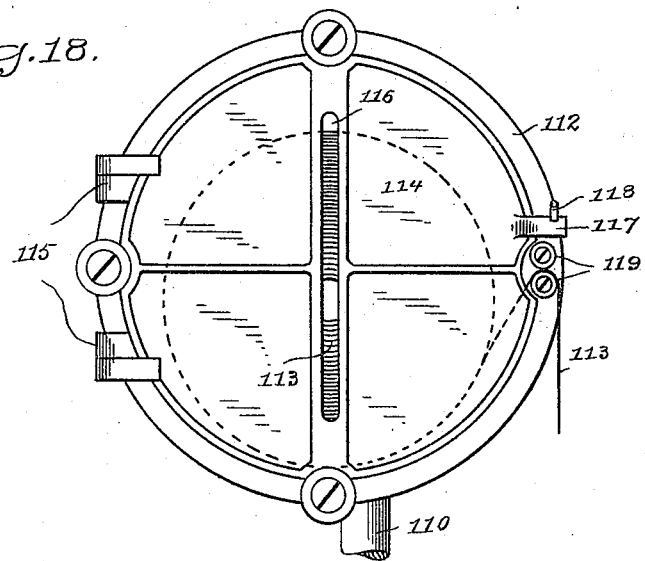
Figure 19:
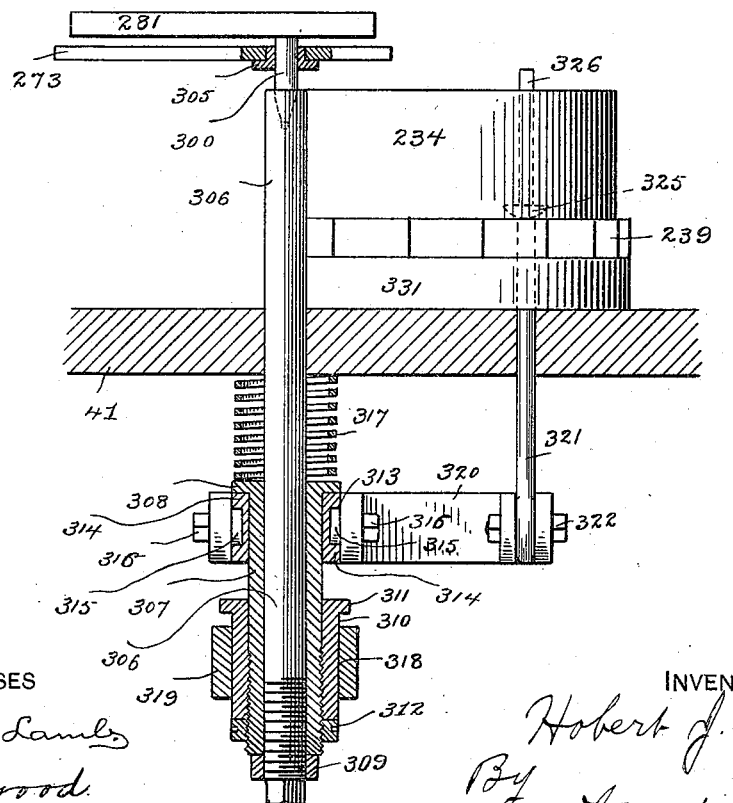
Figure 20:
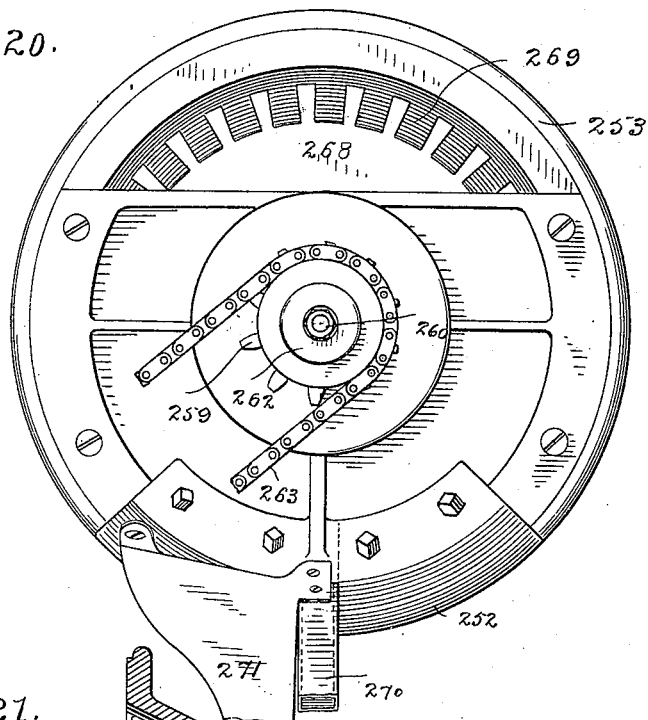
Figure 21:
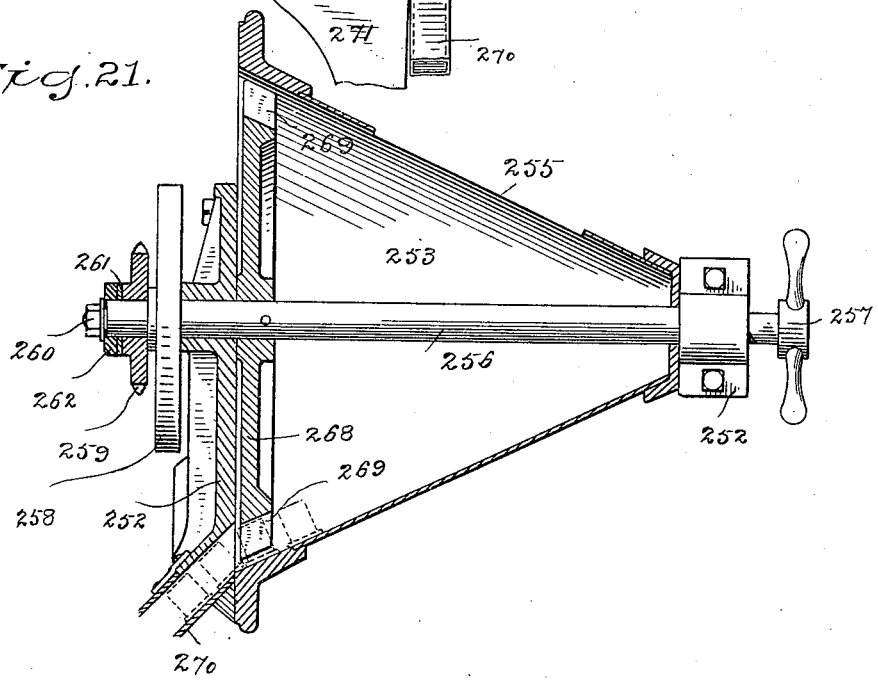
Figure 22:
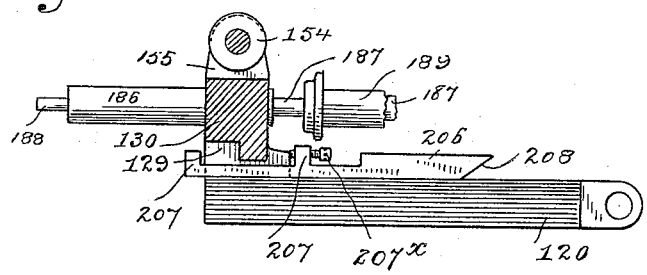
Figure 23:
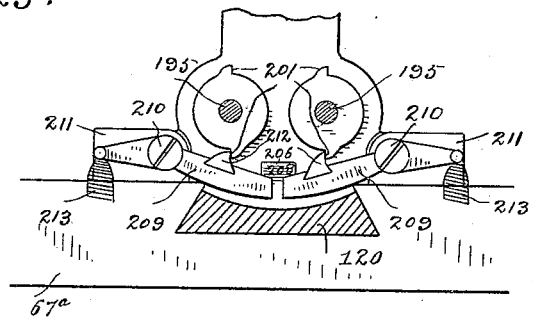
Figure 24:
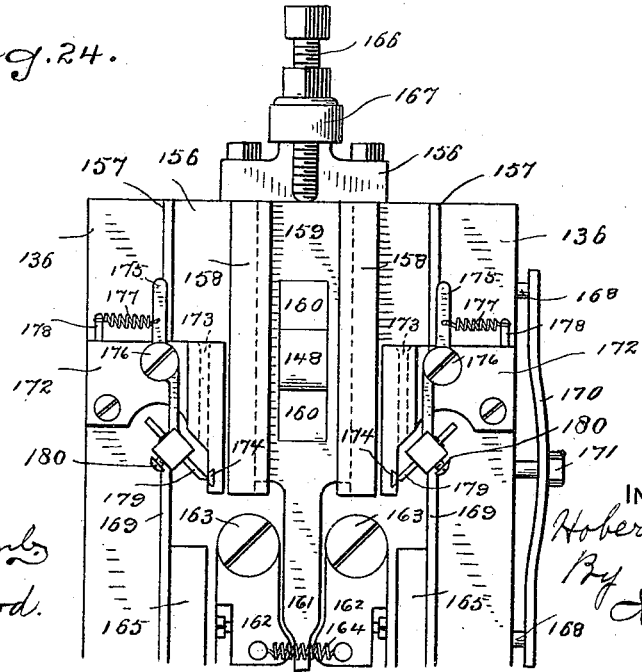
Figure 25:
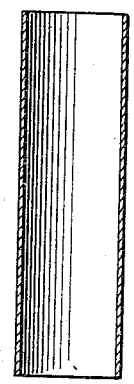

In the accompanying drawings, in which similar reference characters indicate the same parts throughout the several views, Figure 1 represents a front elevation of the entire machine embodying my invention, some details being, however, omitted or partly broken away for convenience of illustration. Fig. 2 represents a plan view of the machine, with the exception of the supply or feed table for the paper cylinders. Fig. 3 represents an end view of the machine, looking from the right of Fig. 1. Fig. 4 represents a rear elevation of the machine. Fig. 5 represents a detail front elevation, enlarged from the scale in Figs. 1, 2, 3, and 4, of the principal parts of the machine which act directly upon the paper tubes and metallic caps to assemble them to form the complete shells, the wadding mechanism being omitted. Fig. 6 represents a plan view of the parts of the machine shown in Fig. 5. Fig. 6ª represents a detail section on line 6ª 6ª of Fig. 6. Fig. 7 represents an elevation of the mechanism shown at the right of the line 7 7 of Fig. 4 on a larger scale. Fig. 8 represents a detail plan view of the mechanism for coiling the paper strips to form the wads and for pushing the wads into the paper cylinders. Fig. 9 represents a side elevation of the mechanism shown in Fig. 8. Fig. 10 represents a front elevation of the same. Fig. 11 represents a rear elevation of the same. Fig. 12 represents a section on line 12 12 of Fig. 9 enlarged to the full size of the machine. Fig. 13 represents a part elevation and part section on line 13 13 of Fig. 12. Fig. 14 represents a detail part plan and part horizontal section of the mechanism for transferring the paper tube and its wad after they have been assembled to the punch and die mechanism for applying the metal caps. Fig. 15 represents an elevation of the chute, which with the transferrer constitutes the secondary feed for taking the tube and wad from the spirally-fluted rolls shown in Fig. 12 and turning it to be properly delivered endwise to the transferrer-jaws shown in Fig. 14. Fig. 16 represents a detail plan view of the presser bar or plate for holding the paper tubes on the spirally-fluted rolls to cause the feed and proper intermittent stopping of said tubes opposite the spreader-punch and the wad-inserters. Fig. 17 represents a detail section on line 17 17 of Fig. 11, somewhat enlarged. Fig. 18 represents a detail elevation of one of the holders for the coil of wad-paper. Fig. 19 represents a detail elevation of the dial mechanism. Fig. 20 represents a detail elevation of the hopper and feed-wheel. Fig. 21 represents a vertical section of the said hopper and wheel. Fig. 22 represents a detail section on line 22 22 of Fig. 8. Fig. 23 represents a detail sectional view on the line 23 23 of Fig. 9. Fig. 24 represents a detail elevation similar to the upper part of Fig. 10, but drawn on a larger scale. Figs. 25 to 32, inclusive, represent sectional views of the paper tube and the metal cap, beginning with their condition as supplied to this machine and representing the step-by-step results of the operation of the machine on the tube and cap separately and assembled, as will be more fully described hereinafter.

Similar reference characters designate similar parts throughout the several views.

The main frame 41 of the machine is supported on suitable legs 42, and secured to the back of said frame are brackets 43, (see Figs. 3 and 4,) having bearings 44 for the main shaft 45, having a driving-pulley 46. Said pulley is adapted to be connected to the shaft by a clutch (not shown) or to run freely when the machine is stopped intentionally or automatically by the mechanism hereinafter described.

The clutch employed in the machine forms no part of my invention and may be of any well-known or preferred type.

In practice the machine illustrated employs the well-known Johnson clutch and brake mechanism for stopping the main shaft at an exact point when the pulley is unclutched from the shaft. The pin for controlling the clutch is indicated at 47 (see Fig. 2) and is adapted to be operated by contact with the inclined or wedge-shaped end 48 of the arm 49 of a lever which is pivoted at 50 to the frame. A spring 51 acts to draw the upper end 48 of the lever down upon the clutch-hub to lie in the path of the pin 47 to unclutch the pulley when permitted to do so by the mechanism presently described. The lower arm of the lever is connected by means of a link 52 (see Fig. 6) with one end of a lever 53, pivoted at 54 to the front of the machine and having its other end provided with a handle 55 (see Fig. 2) and extending through a horizontal guide 56, formed in a bracket attached to the front of the machine.

Pivoted to the right-hand end of the frame (see Fig. 3) is a lever 57, having a handle 58 at its front end and a catch-shoulder 59 behind said handle, said catch-shoulder being adapted to engage behind the lever 53 to hold it in outward position and the arm 49 raised out of the path of movement of the clutch-pin 47 to permit the machine to operate.

Attached to the end of the frame is a magnet 60, having its armature 61 formed with a hook 62 at its lower end, adapted to engage the inner end of the lever 57 to hold it in position with its shoulder 59 across the space in the guide 56, and said lever 57 is provided with an upwardly-extending finger 63, which rides over the end of the armature-hook 62 and prevents it from getting out of position to catch the end of the lever. The lever 57 is shown in Fig. 3 in the position which it occupies when the machine is stopped, and a spring 64 acts to hold the lever in this position and against a stop 65.

When the handle 55 is pulled out to start the machine, the operative also presses down on the handle 58 to cause the shoulder 59 of the lever 57 to engage behind the lever 53 and to also cause the end of lever 57 to be engaged and held by the hook 62 of the armature; but whenever an electric circuit is completed through the magnet either intentionally by the operative or due to the automatic action of certain parts of the machine, as will be hereinafter described, the armature is attracted by the magnet and releases the lever 57, permitting spring 64 to shift the catch 59 above the guide 56, and thus release the lever 53. The spring 51 then acts through the link 52 to throw the handle end of lever 53 outward and at the same time throws the inclined end 48 of the arm 49 into the path of rotation of the clutch-pin 47, and thus stops the machine.

Figure 26:
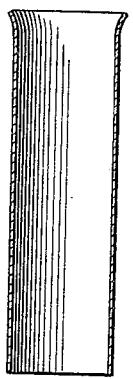
Figure 27:
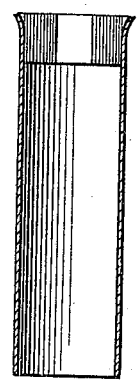
Figure 29:
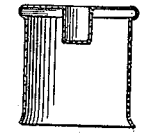
Figure 30:
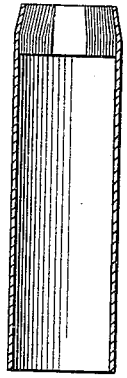
Figure 31:
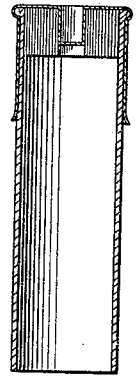

The parts and groups of mechanism will now be described so far as possible in the order in which they act on the tube and cap to prepare them and to unite them to form the shell. Such description will be clearer, however, by prefacing it with the brief explanation that the machine takes the paper tubes in the shape shown in Fig. 25 and first flares one end of the tube, as shown in Fig. 26, and makes and inserts the wad to the position shown in Fig. 27 and then compresses or pinches the wadded end of the tube, as shown in Fig. 30. During this last operation another part of the machine takes a cap in the shape shown in Fig. 28 and flares its edge, as shown in Fig. 29. Then the wadded tube and the cap in the forms illustrated, respectively, in Figs. 30 and 29 are assembled and the pinched end of the tube restored to normal position, as shown in Fig. 31, and finally the flared edge of the cap is compressed and restored to cylindrical shape and the shell thus completed, as in Fig. 32.

The paper tubes are fed by an operative or attendant from a suitable table (not shown) to the hopper 66, supported at one end of the bed 67, which is secured to the front wall of a bed 67$^a$ by means which will permit of the vertical adjustment of the bed 67 relatively to the bed 67$^a$, as hereinafter described.

The front wall of the hopper is composed of a slowly-moving wing or vibrator 68, (indicated by dotted lines in Fig. 5,) the object of which is to keep the shells in the hopper agitated so as to insure their successive passage out through the opening under the lower edge of the vibrator, the said opening being only wide enough to permit the passage or feed of but one tube at a time. Said vibrator is secured to a shaft 69, mounted in bearings formed in the sides of the hopper or in standards 70 at the sides thereof, and an arm 71, having a slot 72 at its lower end, is secured to said shaft. A block 73, carried by the transferer-slide 222, hereinafter described, is provided with an arm 74, which has a pin 75 entering the slot in arm 71. Hence as said slide reciprocates the vibrator is caused to oscillate to press against and recede from the tubes in the hopper.

Mounted in bearings in the bed 67 and extending horizontally forward from under the hopper are two shafts 76, having reverse spiral grooves (see Figs. 2 and 6) and geared to rotate in opposite directions by the pinions 77, (see Figs. 3 and 5,) fast on their outer ends. A gear 78 meshes with one of the pinions and is mounted loosely on a stud-shaft projecting from the frame, said gear having its hub formed with ratchet-teeth 79. An arm 80 is mounted loosely on the said stud-shaft and is provided with a pawl 81, which is kept in engagement with the ratchet-toothed hub of the gear by means of a spring 82. The outer end of the arm 80 is connected by a pitman 83 with a crank 84, fast on the main shaft 45. The rotations of the crank 84 cause the pawl to impart a step-by-step rotation to the gear 78, the pinions 77, and the spirally-grooved shafts, and thus said shafts take the tubes one by one from under the vibrator and advance the entire series held by the grooves (see dotted lines in Fig. 6) with an intermittent motion, which causes the stoppage of the tubes in a horizontal plane and position, to have their ends spread and then filled with wads, as more fully hereinafter described.

To preserve the proper position of the tubes on the conveyer-shafts and keep them down in the grooves thereof, vertical guide-plates for the ends of the tubes and a top plate or presser are provided. The vertical guide-plates 85 and 86 are clearly shown in Figs. 2 and 6, the outer one 86 being adjustable, to suit the length of tubes used, by means of the slotted wings 87 and screws 88, passing through the slots thereof into the bed 67. Screws 89, tapped through blocks 90 on the bed and bearing against the guide 86, are employed to obtain fine adjustment, after which the screws 88 hold said guide in place.

The top plate or presser (see Figs. 2, 5, and 16) is composed of a fixed plate 91 and a wing 92, hinged thereto. The fixed plate 91 is brazed or otherwise secured to, or it may be a part of, a bracket-piece 93, which is secured to a block 350 on the bed back of the inner guide 85, and said plate 91 extends rearward to about the line of the front edges of the side walls of the tube-hopper, so that the tubes therefrom, as they are engaged by the ends of the spiral grooves of the shafts 76, are advanced into the machine under said plate 91. The wing-plate 92 is hinged to the plate 91, as at 94, and extends nearly to the inner ends of the shafts 76, so as to hold the tubes down in the grooves of said shafts. A spring 95 is hinged to the plate 91 at 96 and is provided with a finger piece or knob 97, which bears on the hinged plate 92 and holds the latter on the tubes with a yielding pressure. The object of pivoting the spring is to enable it to be swung outward to clear the hinged plate to enable the latter to be turned upward and back to give access to the shafts 76 and the space between the guide 85 and 86.

While the tubes are held stationary by the grooved shafts during the periods of rest of the latter, as hereinbefore described, they are first acted upon by a horizontally-movable spreading-punch, and then are farther advanced and stopped by the shafts in position to receive their wads, and are then again advanced to the secondary feeding mechanism, which presents the wadded tubes to the dial mechanism for applying the caps. The movements of the tubes while being spread and wadded are in a horizontal direction while held in a horizontal plane, and the arrangement and operation of the devices for so acting on the tubes are in the same horizontal plane, and therefore the parts and tools are all in a convenient and accessible position either for inspection or removing or cleaning.

The spreading-punch comprises the head 98, (see Figs. 6 and 6ª,) carried at the outer end of a rod 99, projecting from a block 100, adjustably secured to a slide 101, fitted to ways on the bed 67ª. Mounted loosely on the rod 99 is a ring 102, having lugs 103 projecting through grooves 104 in the head 98, a spring 105 being coiled about the rod 99 between the block 100 and the back of the ring 102. When the slide 101 is projected, the head 98 moves rigidly therewith and spreads the end of the tube which has been stopped in front of it, while the lugs 103 abut against the end of the tube and remain stationary during the advance of the head; but on the withdrawal of the slide and head the lugs 103 are still held against the end of the tube by the pressure of spring 105, and thus act to strip the tube from the head to prevent it from being drawn out of position by the backward movement of the head.

The slide 101 is reciprocated at the proper intervals by the lever 106, pivoted at 107 to a bracket at the rear of the main frame and having a pin or roll at its lower end entering a cam-groove 108 in a disk 109, secured on the main shaft 45.

After each tube has been spread at its end to readily receive the wad it is advanced by the shafts 76 to position in front of one of the wadding mechanisms. There are two such mechanisms, duplicates of each other, and the wads are inserted in pairs—that is, the spiral shafts are given two movements to one complete operation of the duplicate wadding mechanism, so as to locate two flared tubes in front of said mechanisms, which two tubes will simultaneously receive the pair of wads which have been formed during the period of time required for the two tubes to reach said position from the spreading-punch.

Before referring to the wadding mechanism in detail the supports and boxes for the coils of paper from which the wads are made will be described, referring particularly to Figs. 1, 2, 3, 4, and 18. Rising from the frame of the machine are two posts 110, connected at their upper ends by a bar 111, to which are secured two shallow cylindrical boxes 112 for holding the coils of paper, one of which is indicated at 113 in Fig. 18. Each box 112 has a front or door 114 hinged thereto at 115 and slotted, as at 116, to enable an attendant to see when a coil has nearly run out, and having a lug 117, adapted to be engaged by a suitable detent or latch 118 for holding the door closed. Two rolls 119 project forward from the back of the box on opposite sides of a slot in the cylindrical body of the box, and the strip of paper emerges between said rolls to the wad-forming mechanism, which will now be described.

Fitted to suitable ways on the bed 67ᵃ is a horizontal slide 120, (see Fig. 6,) operated by means of a lever 121, (see Fig. 4,) connected at 122 to said slide and pivoted to a bracket on the frame of the machine at 123. The lower end of the lever is provided with a pin or roll entering a cam-groove 124, (see Fig. 3,) formed in the side of a gear 125, mounted on a short counter-shaft in bearings 126 and meshing with and driven by a gear 127 on the main shaft 45. The greater portion of the cam-groove is concentric with the axis of rotation; but at one end of the inward curve the cam is formed with a slight outward curve, as at 128 in Fig. 3, to impart to the lever a movement that will give the slide 120 a short outward movement or "hitch" and then its full inward movement and then its return to its position caused by the concentric portion of the cam-groove. The purpose of this hitch is to actuate the paper-knives, as will be hereinafter described, and this mechanism forms an important feature of my invention. In fact, it may be as well to call attention at this point to the fact that the slide 120 and its movements are important, as it is from this slide that most of the parts relating to the wad forming and inserting operation derive their different movements.

The gear 127 on the main shaft is of a size to drive the cam-gear 125 at one-half the speed of the main shaft, and hence the slide 120 makes one complete reciprocation and operates the two wad-inserters, which are reciprocated by said slide, as presently described, once for every two operations of the tube-spreader above described.

The slide 120 at its inner end is provided with a block 129, supporting a cross-head 130, (see Figs. 9 and 12,) which block and cross-head are preferably in one piece, the cross-head having a roll 131 at each end which enters a slot 132 in one arm of a lever 133, pivoted at 134 to a foot-piece 135 of a casting 136. The casting 136 is shown in different views in Figs. 8, 9, 10, and 11. It bridges over the slide 120 and is bolted to the bed 67ᵃ and is provided with the various bearings and ways for the pivoted and sliding parts of the wadding mechanisms, hereinafter described.

Each of the levers 133 is connected at its outer end to a slide 137, fitted to ways formed horizontally in the face of the casting 136, said slide having a block 138 secured to its outer face and carrying a knife 139 for severing the paper strip. The block 138 is vertically adjustable on the slide 137 by means of a bolt 140, passing through a slot in the block into said slide, the latter having a vertical groove 141 to receive a rib on the back of the block to steady the block on the slide. Each knife 139 is adjustably secured to the top of its block by a bolt 142, passing through a slot 143, formed in the flat shank of the knife. It will now be understood that the knives may be readily adjusted for accurate working in connection with the slots of the tubes through which the paper passes to be rolled into wads, as hereinafter described.

Referring to Fig. 12, it will be seen that the slots 132 have straight portions which are parallel with each other when in the position shown in said figure and that the advance of the cross-head 130 from said position will not operate the knives; but the rear portions of the slots 132 are at such an angle to the straight portions that when the cross-head recedes from said position the rear ends of the levers 133 are spread apart and their front ends advance the knives to sever the two paper strips. As hereinbefore stated, the short outward movement of the slide 120 and its cross-head 130 to effect this cutting operation of the knives is obtained by means of the outward curve or hitch cam 128, which operates the cross-head just the necessary distance required for the action of the rolls 131 in the angular portions of the slots of the levers 133.

As shown in Figs. 12 and 13, I provide guides 144 for the paper strips which are fed to the tubes of the wad-winders, each of said guides comprising a vertical slot formed in a block 145, having a slot 146, through which a bolt 147 passes into the slide 137, thus providing for the adjustment of the guide to secure alinement of its slot with the slot in the tube of the wad-winder, which has yet to be described. The guide 144 is therefore movable with the knife and avoids the bending of the end of the strip by the cutting action of said knife.

After the strips of paper have been severed by the knives and after the formed wads have been forced into the paper tubes it is essential that the ends of the strips of paper above the knives shall be given a short positive feed to insert their ends in the slits of the winder-spindles for the formation of the next pair of wads. The means for effecting this feed will next be described. Located within a hollow vertical space in the casting 136 is a lever 148, pivoted at 149 and operatively connected, as by intermeshing teeth 150, (see dotted lines in Fig. 9,) with another and shorter lever 151, which has a lower bearing-surface 152 and a cam or toe 153, which are acted upon by a roller 154, mounted in bearing-blocks 155, which rise from the cross-head 130. The reciprocations of the slide 120 and its cross-head cause the roller 154 to engage the toe or cam 153 of the lower lever and oscillate the said lever in a direction to cause the long arm of the lever 148 to be depressed. The reverse movement of these parts is caused by the return movement of the roller along the bearing-surface 152 of the lever 151. A main vertical slide 156 is fitted to ways 157 in the front face of the casting 136 and is itself provided with vertical ways 158 for a smaller supplemental slide 159. The end of the lever 148 extends through suitable openings (not shown) in the front wall of the casting and in the main slide and is fitted between bearing-blocks 160, set in an opening in the supplemental slide. (See Figs. 10 and 24.) Therefore the oscillations of the lever 148 are communicated directly to the supplemental slide. The said slide 159 extends downward and is reduced in width to form two cam-surfaces 161, adapted to act laterally on two clamps 162, pivoted at 163 to the main vertical slide 156 and held toward each other and in contact with the downward extension of the supplemental slide by means of a spring 164. Opposite the outer edge of each clamp 162 is a block 165, secured to the main slide, and these blocks are so positioned as not to permit the clamps to separate far enough from each other to allow the cams 161 to pass down between them. The strips of paper extend down between the outer edges of the clamps and the blocks 165 on the main slide, and hence the first downward movement of the end of the lever 148 and of the supplemental slide causes the cams 161 to spread the clamps and grip the paper against the blocks 165, and the further downward movement of said supplemental slide carries the main slide 156 with it, for the reason that the cams 161 cannot slide down between the lower parts of the pivoted clamps. On the return or upward movement of the supplemental slide the cams 161 first rise above the clamps and permit the spring 164 to cause the clamps to release the paper, and the continued rise of the supplemental slide brings its upper end in contact with a stop carried by the main slide, said stop in this instance being shown as composed of a screw 166, adjustable in a bracket 167, overhanging from the top of the main slide, and such continued rise therefore elevates the main slide and its clamps ready for the next feed. The necessary friction to prevent the downward movement of the main slide prior to the stroke of the cams 161 on the clamps, as above described, may be obtained by pins 168, (see Figs. 10 and 24,) passing through the side of the casting 136 to cause friction of one of the way strips or gibs 169 against the slide, said pins being pressed inward by the ends of a spring 170, the tension of which may be adjusted by a screw 171, passing through its center into the casting.

It will now be understood that the movements of the acting faces of the clamps constitute a four-motion feed acting, in conjunction with the two-motion feed of the blocks 165, to positively grip and feed the strips of paper to insert their ends in the slits of the wad-winders, which will be hereinafter described; but to prevent any liability of the paper being lifted as the feed-slides rise I provide stationary friction-clamps just above the gripping-clamps, and this constitutes an important feature of my invention. As shown in Figs. 10 and 24, a bracket 172 is secured to the face of the casting 136, on each side of the main vertical slide 156. The bracket is formed with a vertical guide-slit 173 (indicated by dotted lines) for the strip of paper, which guide-slit is in line with the space between one of the clamp-jaws and its coacting block. In the side of the flange of the bracket which depends below the guide-slit 173 is a horizontal groove, which receives and retains a renewable wear plate or bar 174, which may be of hardened steel or glass. A lever 175 is pivoted to the bracket 172 at 176 and has its upper end connected by a spring 177 with a suitable fixed part, as a pin 178, in the bracket. The lower end of the lever 175 has a passage through it for a plate or presser 179, which is adjustably secured therein by a clamp-screw 180, the edge of said plate being pressed toward the bar 174 by the spring 177, and thus caused to exert a frictional hold on the paper to prevent its being drawn upward out of the guide 144 by the upward movement of the feed-jaws after it has been cut, as heretofore described.

The means for supplying, cutting, and feeding the paper having been fully pointed out, I will proceed to describe in detail the means for taking the end of paper, coiling it into a wad, and inserting it in the flared end of a tube, all of the movements necessary to these operations (except the rotary movements of the coiling-spindles) being obtained from the slide 120. Secured to the front wall of the casting 136, between the two cutter-slides 137, is a block 181, (see Figs. 10, 12, and 13,) having two horizontal openings which communicate with the top surface of said block, each of said openings being adapted to hold a cylindrical shell or bushing 182, having a plurality of slits 183. The top of the block is formed with two lugs 184, rising each side of each of said openings, the two lugs of each pair being united by a clamp-bolt 185, by means of which the cylindrical bushing may be clamped in its opening in the block, with one of its slits in line to receive the strip of paper. When the slit becomes worn, the clamp-bolt may be loosened, the bushing partly rotated to bring another of its slits uppermost, and again clamped.

The bushings are located in line with the positions of a pair of paper tubes brought and held there by the spirally-grooved shafts, and it is within these bushings that the wads are formed by the coiling of the paper strips and from which they are ejected and inserted into said paper tubes.

Secured in the block of the main slide 120 and below the cross-head 130 are two sleeves 186, which I will refer to as the "wad-inserters," for the reason that their function is to insert the wads in the paper tubes, said inserters being held by set-screws 186ª. They reciprocate, with the cross-head, from the position shown in Fig. 12 to a point far enough to insert the wads, one of which is shown as inserted in the right-hand paper tube. Extending longitudinally through each wad-inserter is a spindle 187, which is never advanced from the position shown in Fig. 12. The sleeve or inserter reciprocates longitudinally on the spindle. The front end of the spindle is provided with a split or bifurcated pin 188, having a rigid drive-fit or pinned connection therewith, the split end always projecting into the bushing 182. The rear end of the spindle passes out at the rear end of the inserter-sleeve and (see Fig. 17 in connection with Fig. 12) enters a sleeve 189, with which it is connected, as by a pin 190. The sleeve 189 is fitted to rotate, but not reciprocate, in suitable bearings in the casting 136 above the slide 120, (see Fig. 9,) and at its end which projects at the rear of the casting is provided with a pinion 191, loosely mounted thereon. Said pinion is provided with an annular recess in its inner side, in which is secured, as by pins 192, a ring 193, having its projecting portion formed wedge-shaped in cross-section. A hub or ring 194 is secured rigidly to the sleeve 189 and is formed with an annular groove V-shaped in cross-section to receive the ring 193 of the pinion 191, thus constituting a frictional connection between the pinion 191 and the sleeve 189 and the paper-coiling spindle, which will permit the latter to stop when sufficient paper has been wound to bind in the bushing 182.

To obtain the necessary yielding pressure of the pinion and the friction-ring carried thereby against the grooved hub, a rod 195, having a head 196, is fitted in a longitudinal recess in the sleeve 189, and a spring 197 is coiled about the rod between the head 196 and the end wall of the recess. The end of the rod 195 projects beyond the end of the sleeve and is threaded and provided with nuts 198, between which and the side of the pinion 191, which also projects slightly from the end of the sleeve, there is located a plurality of thin metallic disks 199. By tightening the nuts 198 on the rod increased friction can be caused between the pinion and hub, as is obvious. To prevent the rod 195 from rotating in the sleeve 189, the latter is formed with a longitudinal groove 200 to receive a key projecting from the head 196 of said pin.

The periphery of the hub 194 is provided with two diametrically opposite teeth 201, the purpose of which will be presently explained.

It is to be understood that the description given of one of the coiling-spindles applies to both. Each has a pinion 191. Both are rotated in the same direction by a gear 202 meshing with both, (see Figs. 8, 9, and 11,) said gear being carried by a shaft 203, having bearings in a bracket 204 at the rear of the casting 136 and having a pulley 205, driven by a constantly-running belt. (Not shown.) When sufficient paper has been wound by a coiler to cause binding in the bushing 182, the coiler stops, the frictional connection between the pinion 191 and the hub 194 permitting this, as above explained, but the pinion continues to run. Of course the stoppage is liable to occur at such point that the slit of the pin 188 will be out of alinement with the upper slit 183 of the bushing 182, and it is therefore essential that after the paper strip has been cut and the wad pushed by the inserter 186 into the paper tube and before the end of the paper strip is fed down to the split pin 188 the latter shall be rotated and stopped, with its split in proper vertical position. As soon as the wad has been slipped off from the pin 188 by the first advance movement of the sleeve or inserter 186 said pin and the spindle 187 and sleeve 189 are free to be rotated by the constantly-running pinion 191; but in the meantime a detent has been located to be in the path of movement of one of the teeth 201 of the hub 194, which teeth are so located that when either of them is stopped by said detent the slit of the pin 188 will be in alinement with the upper slit of the bushing 182. I will now proceed to describe this detent mechanism.

Above the main slide 120 and fitted to independent ways in the base of the casting 136 is a smaller supplemental horizontal slide 206, (see Figs. 9, 11, 22, and 23,) having its inner or front end extending through an opening formed therefor in the base of the block 129 and provided with lugs 207, adapted to be alternately struck by the front and rear sides of said block as it reciprocates with the slide 120, whereby the slide 206 receives its movements from the slide 120, the rear lug having a set-screw 207×. The lugs 207 are so spaced, however, as to impart but a slight reciprocating movement to the slide 206.

The rear or outer end of the slide 206 is beveled on the under side, as at 208, to ride over and depress the inner ends of two detent-levers 209, (see Figs. 11 and 23,) each of which is pivoted at 210 to a block 211 at the back of the casting 136. Each of said levers has a detent 212, which is held against the periphery of the hub 194 by a spring 213, connecting the outer end of the lever with a fixed pin 214. When the slide 120 has advanced and pushed the wads off from the split pins, the block 129 strikes the forward lug 207 of the slide 206 and causes the rear end of the latter to release the levers 209 and permit the springs 213 to bring the detents 212 into the path of movement of the teeth 201 on the hubs 194, thus instantly arresting them, with the split coiling-pins 188 in the proper position to receive the next feed of paper. The feed then takes place, and when the slide 120 recedes the block 129 strikes the set-screw 207× in rear lug 207 of the slide 206 and causes the incline 208 to depress the levers 209 and remove the detents from the teeth 201, thus permitting the frictional connections of the pinions 191 with the hubs 194 to cause the next coiling operation. This last action of the slide 120 on the slide 206 occurs during the latter part of its rearward movement while the rolls of the cross-head 130 are still in the parallel portions of the slots of the levers 133. The concentric portion of the groove 124 in the gear 125 is of such length that the slide 120 remains at the point indicated in Figs. 8 and 12 more than sufficient time for the wads to be coiled from the thinnest paper used. When the "hitch-cam" 128 acts to give the slide the short backward movement necessary to actuate the knives, as hereinbefore described, the under side of the rear end of the slide 206 simply rides over the levers 209 without disturbing them.

It will now be understood that by means of all of the above-named elements, beginning with the slide 120, the complete operations of forming, cutting off, and inserting the wads in the paper tubes are performed and that all of the operations, with the exception of the rotary movements of the spindles, are caused by the reciprocations of the said slide, including the relative timing of the operations. The greatest accuracy is thereby insured and all of the parts are compactly arranged and no possibility of disarrangements of the mechanisms exists. Furthermore, owing to the fact that the slide 120 is reciprocated once to every two reciprocations of the spreading-punch 98, as hereinbefore explained, and since all the parts of the mechanism for forming and inserting the wads in pairs are either operated directly or controlled by said slide there is no possibility of any irregularity in the timing of the relative movements of the parts of the machine.

After the insertion of the two wads into the paper tubes by the action of the reciprocating sleeves 186, the said tubes being held from lateral movement by the shafts 76 and from endwise movement by the guide 86, the said shafts are given two step movements before the sleeves 186 again act, two new tubes being thereby brought into alinement with the bushings 182 and the two with the wads therein being moved to the left, and so on. Each wadded tube as it reaches the ends of the shafts 76 falls therefrom into a chute 215, (see Figs. 2, 5, 6, and 15,) secured by screws 216 to the end of the bed 67. The spindle of the shaft 76 along which the wadded end of the paper tube travels is prolonged to form a stop 217 to temporarily retain the said wadded end thereon, so that the tube will drop into the chute wadded end uppermost. A removable plate 218 is hooked on the upper edge of the chute and occupies the position indicated by dotted lines in Fig. 15 and constitutes a wall or guide to prevent the complete overturning of the tube as it falls into the chute. The plate 218 may be replaced by one which will present a wall or guide at a greater or less distance from the opposite or rear wall, according to the length of the tubes being operated upon.

The lower end of the chute is open to permit the tube to fall endwise, as described, upon a stop or shelf 219 (see Fig. 14) and between the open jaws 220 of the secondary feed, which jaws are adapted to close on the tube and then advance to the position shown in Fig. 6 to transfer it to the dial mechanism. The two jaws 220 are pivoted at 221 to a slide 222, fitted to ways in the top of frame 41, under the overhanging portion of the bed 67. The slide 222 is reciprocated by a lever 223, as presently described, the end of said lever having a socket-joint with a block 224 on said slide. Near the block 224 is a block 225, having two lugs 226, between which the rear ends of the pivoted jaws extend, a spring 227, between said ends of the jaws, acting to normally press the said ends apart from each other and toward the stop-lugs 226, and consequently to close the outer ends of the jaws toward each other. A plate 228, extending down from the chute 215, acts as a rear wall to prevent a tube from being moved backward after dropping on the stop 219. The outer ends of the transferrer-jaws are curved to fit a paper tube, and just back of these curved portions the jaws curve toward each other, as at 229, back of which a wider space exists between the jaws. The inward-bent portions 229 of the jaws act as cams which when the jaws are receding from the position shown in Fig. 6 to the position shown in Fig. 14 engage the sides of a tube resting on the stop 219, against the back wall 228, and ride over said sides until the ends of the jaws grasp said tube. On the advance movement of the transferrer the tube engaged by the jaws is advanced to position under the plunger 293, hereinafter described, and by means of which said tube is pressed down below said jaws. While the jaws are in their advanced position another tube drops from the chute 215 onto the stop 219 and between the jaws back of their cam portions 229, ready to be grasped by the jaws when they recede. This operation is repeated, thus constituting a secondary feed for taking the tubes from the wadding mechanism and transferring them to the dial mechanism for applying the metal caps thereto.

The lever 223, which reciprocates the feed-slide 222, extends through an opening therefor in the frame of the machine, as shown in Fig. 4, and is pivoted at 230 in said opening (see Fig. 6) and is provided with a roll 231 at its rear end, entering a cam-groove 232 in a hub 233, secured on the main shaft 45, said cam-groove actuating the slide 222 through the medium of said lever.

As above mentioned, the tubes fed by the jaws 220 are pressed therefrom one by one. The mechanism for further treating the tubes will next be described.

Referring to Figs. 5, 6, and 7, the cylindrical dial or tube-carrier 234 is mounted to rotate about a stud 235, secured to and rising from the bed or top of the frame 41. A bell-shaped disk 236 is located in the cup-shaped recess of the dial or carrier 234 and bears on the bottom thereof a nut 237, screwed on the upper end of the stud 235, serving to adjust the friction of the carrier on its support. A step-by-step rotary motion of the dial or carrier 234 is imparted thereto by means of a pawl 238 engaging teeth 239, formed on the lower part of the periphery of the dial, said pawl being pivoted at 240 to a slide 241, mounted to reciprocate in ways formed in the top of the frame 41. A spring 242, secured to a block 243 at the rear end of the slide and bearing against a heel 244 of the pawl, holds the front end of the latter in engagement with the teeth of the dial. The slide is reciprocated by means of a cam-groove 245, formed in the side of a cam-disk 246, secured to the main shaft 45, as indicated in Fig. 2, said cam-groove receiving a block or roll 247 projecting from the block 243, as shown in Fig. 6.

The cylindrical dial is formed with an annular series of vertical recesses or pockets containing pins, which will be more fully described hereinafter as to their construction and operation. The wadded tubes are successively located over the pins and are pushed from the transferrer-jaws and into the recesses around the pins by the plunger 293, hereinafter described. The tubes are then carried around by the dial under another tool, which pinches the upper ends of tubes and their wads successively (see Fig. 30) to prepare them to receive the metallic caps.

Before further describing the tube-dial and the operations which take place in connection therewith I will detail the means for supplying, feeding, and flaring the metallic caps to prepare them for meeting the wadded tubes in the dial 234.

Figure 28:
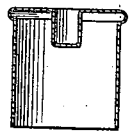

Bolted to the base or frame 41 of the machine, at the left-hand end as viewed in Figs. 1, 2, and 6, is an upright or casting 251, to the upper part of which are secured brackets 252, (see also Figs. 20 and 21,) which support a hopper 253 for the metallic caps, such as shown in Fig. 28. Said hopper is preferably cone-shaped, the longitudinal center of the cone being in a horizontal plane. A filling-chute for the hopper is shown at 254, the top of said hopper also having an opening 255 for convenience of access to its interior. Mounted in bearings in the brackets 252 is a shaft 256, extending through the longitudinal center of the hopper and having a hand wheel or spokes 257 at one end, by means of which it may be rotated by hand. The other end of the shaft is provided with a disk 258, rigidly secured thereto. The shaft extends through said disk, and a sprocket 259 is loosely mounted on the projecting portion of the shaft, said sprocket being clamped against the disk by a nut 260, threaded on the end of the shaft, a washer 261 and a leather or other friction disk 262 being interposed between the nut and the sprocket. This frictional connection is to enable the shaft to be rotated by hand without rotating the sprocket.

The sprocket 259 is rotated by means of a chain 263, connecting it with a smaller sprocket on a short counter-shaft 264, mounted in bearings in a bracket 265, secured to the upright 251. The other end of the shaft 264 is provided with a larger sprocket connected by a chain 266 with sprocket-teeth 267 on the main shaft 45. The relative size of the sprockets is such as to impart quite a slow speed to the shaft 256 relatively to that of the main shaft.

A disk 268 is secured to the shaft 256 at the large end of the hopper, the periphery of said disk being parallel with the inner walls of the hopper and at a distance therefrom a little more than the thickness of the heads or flanges of the caps. (See Fig. 21.) The said periphery is divided, however, into a large number of teeth by a series of radial slots 269, having parallel sides, (see Fig. 20,) the width of which is just sufficient to receive the cylindrical portions of the caps. These features of construction render it impossible for the caps to escape from the hopper, except when they enter the radial slots or pockets in the position shown in Fig. 21. Thee feed wheel or disk is constantly rotating, and the caps in the hopper slide down the inclined bottom thereof and press against the inner side of the wheel. Those caps which enter the pockets in the right position are free to pass through at the proper time, as presently described, while those which may be picked up in other than correct positions drop out when elevated to the upper part of the hopper.

The lower part of the bracket 252, which forms the closed end of the large end of the hopper, is formed with an opening of the shape to permit the caps to escape one at a time, said opening communicating with a chute 270, which extends from the hopper in one direction and curves under the hopper in the reverse direction, as shown in Fig. 4, to the point of delivery. It is therefore obvious that while the caps leave the hopper heads down they are delivered heads up. This cap-feeding mechanism I regard as a very important feature of my invention, and I wish to be understood as not limiting myself to its use solely in connection with machines for making paper shells. The same mechanism may be well employed in other machines for acting on caps and shells generally having the approximate shape of a cylinder with a head or flange at one end, and, in fact, it may be employed as a feeder for other articles, such as rivets, tubular or solid.

Referring again to Fig. 20, I provide an opening at one side of the upper end of the chute 270, from which any surplus of caps above the number that will fill the chute may escape through a side chute 271 to any suitable receptacle.

As shown in Fig. 5, the lower end of the chute 270 is supported by a bracket 272, bolted to and rising from a circular plate 273, which is in turn supported by a bracket 274, bolted to the bed or frame of the machine between the front and rear walls of the upright 251. (See Fig. 6.) Said bracket 274 supports and forms a bearing for a spindle having a toothed disk or ratchet 275 at its lower end adapted to be engaged and rotated step by step by a pawl 276, pivoted at 277 to the slide 241, and having its heel 278 actuated by a spring 279, connected to the block 243. The end of the pawl 276 is provided with an upright pin 280, which engages the teeth of the ratchet 275. Secured to the upper end of the spindle above the plate 273 is the dial 281, having recesses or pockets 282 for the metal caps, said dial having a cup-shaped friction-disk 283, bearing upon its upper surface substantially in the same manner and for the same purpose as disk 236 for the tube-dial 234.

The two dials 234 and 281 are rotated in the direction indicated by the arrows in Fig. 6 by the slide 241 and its pawls 238 and 276, and while the wadded tubes are brought into position to be pressed into the recesses or pockets in the dial 234 the caps are brought into position to be pressed into the pockets of the dial 281, the said caps as they slide down the chute stopping between two curved spring-jaws 284, attached to opposite sides of the lower end of the chute, said jaws temporarily holding each cap until it is pushed therefrom by a plunger 299, which will be presently described. A portion of the cap-chute and the jaws 284 are shown in horizontal section in Fig. 6 in the position which said jaws occupy to hold the caps in position one at a time over the dial 281 and in line with one of the pockets of the latter when in stationary position.

In Fig. 5 a portion of a slide 285 is shown in side elevation, the ways for this slide being omitted to permit of the proper illustration of the tools carried by said slide. The ways for said slide are formed in the inner walls of the upright or standard 251, as indicated in Fig. 7, and a short link 286 connects said slide with the inner end of a lever 287, pivoted at 288 to the standard and having its outer end connected with a pitman 289, having an eccentric-strap 290 at its lower end fitting an eccentric 291 on the main shaft 45. The pitman is adjustable in length, as indicated at 292, to enable the slide to be adjusted as to the lowest point to which it and the tools carried thereby may be driven by the eccentric. In Figs. 5 and 7 the slide is represented as in its lowest position. The said slide carries the plunger 293, which pushes the wadded tubes down from the transferrer-jaws into the pockets of the tube-dial, said plunger being mounted to yield vertically within a barrel or sleeve 294, carried by the slide-head. The plunger is provided with an arm 295, projecting out through a slot in the sleeve or barrel 294 for a purpose which will be hereinafter explained, the spring 296 for yieldingly holding the plunger downward in the barrel being indicated by dotted lines in Fig. 7. The tubes deposited in the tube-dial are carried around thereby unacted upon until they arrive below the crimping or pinching die 297, which is of well-known construction and needs no further description herein than to say that it comprises a hollow tapering die carried by the slide-head and adapted to pinch the wadded end of the tube and give it a slightly-tapering form, as shown in Fig. 30, said die being also tubular throughout its length to permit a fixed rod 298 to extend through it, the lower end of the rod being in the plane close above the plane of the tops of the tubes and serving as a stop-rod to prevent the rising movement of the pinching-die from lifting the crimped tube out of its pocket in the dial.

While the operation on the wadded tube just described is taking place, the cap which will be applied to that tube and which is the one then held by the jaws 284 is depressed by the plunger 299, carried by the slide-head into one of the pockets in the cap-dial 281. At the same instant and while the plunger 299 is still on the cap in the dial-pocket a punch 300 rises through an opening in the plate 273 into the cap, the said punch 300 being of a shape adapted to slightly expand the lower edge of the cap to the form shown in Fig. 29, whereby the cap may the more readily be pushed onto the pinched upper end of the wadded tube when the two meet in alinement, as presently described, by the continued rotation of the two dials.

The punch 300 is operated by a lever 301, adjustably connected thereto, as presently described, said lever being pivoted at 302 to a lug under the frame 41 and having a roll 303 held against the cam 246 by a spring 304, connected to the long arm of the lever and to a suitable lower fixed point, as the floor on which the machine rests.

The opening in the plate 273, through which the punch 300 rises, is shown in Fig. 19 as formed in a bushing 305, secured in said plate, and the punch is carried by a vertically-movable rod 306, said rod extending through the bed of the machine and being guided in its vertical movements thereby and by the punch in the bushing 305. The rod 306 extends down through a sleeve 307, having a flange 308, said sleeve being internally threaded at its lower end, by means of which it is secured on the lower threaded end of the rod, a set-nut being indicated at 309.

Screwed upon the lower end of the sleeve 307 is a shorter sleeve 310, having a flange 311 at its upper end, a set-nut being indicated at 312. Fitted to the sleeve 307 and adapted to slide thereon between the flanges 308 and 311 is a sleeve 313, having flanges 314, between which are the blocks 315, carried by pins 316, projecting inward from the fork of the lever 301. The object of this construction, whereby provision is made for lost motion between the lever 301 and the rod 306, will be presently described. The object of the screw-thread connection between the inner sleeve 307 and the rod 306 is to vary the point to which the punch will be elevated by the lever. The object of providing the sleeve 310, adjustably screwed upon the sleeve 307, is to enable the lower point to which the punch descends to be always in line with the top of plate 273, so that a cap cannot become caught in the hole in the bushing 305. The downward movements of the rod 306 and its punch are obtained by a spring 317 between the bed 41 and the flange 308 of the sleeve 307.

The sleeve 310 reciprocates in a vertical bearing 318 formed in the lower end of a bracket 319, the flange 311 of the sleeve 310 abutting on the upper end of said bearing to limit the downward movement of the sleeve 307 and the rod 306 and its punch, said sleeve 310 being adjustable as and for the purpose just above described.

An arm 320 extends laterally from the lever 301, and a vertical rod 321 is pivoted thereto at 322 and extends up through a guideway in the bed 41 in position to successively operate upon the heads of the pins in the tube-dial pockets to lift them so as to raise the shells to be grasped by the "pick-up," hereinafter described. It is preferable that this lift-rod 321 shall have a greater travel than the punch-rod 306, and therefore it is pivoted, as at 322, to the lever 301, so as to receive full motion therefrom, while the connection of the punch-rod 306 with the lever 301 is through the sleeve connections, so as to permit of the lost motion above referred to.

The pockets of the tube-dial 234 are formed by boring from above and below to form not only the tube or shell pockets 323, but the bottom recesses 324 also, which receive the heads 325 of the pins 326, which extend up through guide-openings in the web, which divide the pockets 323 from the recesses 324. After each tube has had its upper end pinched or contracted by the die 297, as above described, it is advanced by the tube dial or carrier until it is brought in alinement with the cap, which has been spread, as also described. Two step movements of the two dials bring the tube and cap into alinement with each other and with the press-rod 327, which is carried by the slide and which on the downward movement of the slide to the position shown in Fig. 5 presses the cap firmly onto the wadded tube.

To prevent the caps from dropping through the pockets, the plate 273 is provided; but said plate is necessarily provided with two openings—one for the punch 300 and one to permit the cap to be pressed onto the tube, as just described. At this latter point the under side of the plate 273 is provided with a centering-guide and radial spring-pressed slides, which are not here shown, but which may be such as illustrated in United States Letters Patent No. 279,497, dated June 12, 1883.

Figure 32:
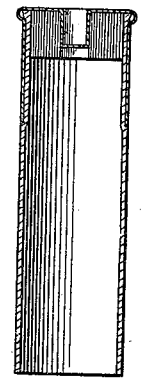

The operation of the press-rod 327 assembles the cap and wadded tube in a dial-pocket 323, but the edge of the cap is still flared, as indicated in Fig. 31. The next operation of the machine is to restore the edge of the cap to its proper shape to complete the shell, as indicated in Fig. 32.

Referring to Fig. 5, it will be seen that each pocket is fitted with three bushings. The upper one 328 is internally tapered to permit of the easy entrance of the paper tubes when transferred to the dial. The second or intermediate one 329 is slightly smaller than the upper one and is formed with a rounded or tapered upper internal edge to act as a die on the flared edge of the cap to press it inward to cylindrical shape. The lower bushing 330 simply aids in holding the die 329 in place and might be a part of the said die, but is in practice separate therefrom, as shown, and made of less hard metal than the die.

The bed or plate 331 on which the heads of the pins 326 rest and over which they travel in a circular path is formed with a curved recess or depression, the outlines of which are indicated at 332 in Fig. 6 by dotted lines. The deepest portion of said recess is at the left, and from there the bottom surface of the recess inclines upward to the level of the top of the plate 331. When the shell formed by the action of press-rod 327 has been advanced two steps by the dial 234, it arrives over the deeper portion of the recess 332 and is in alinement with a plunger 333, carried by the slide-head, and by said plunger the shell is depressed, the pin 326 going with it, and the flaring edge of the cap is pressed inward by the annular die 329. Two more step movements of the dial 234 carry the head of the pin 326 up the inclined recess 332 and bring said shell and its pin into alinement with the lift-rod 321, which then rises, as hereinbefore described, and lifts the pin a distance substantially equal to the height of the recesses 324. The pin carries the shell with it and meets the downwardly-moving pick-up 334, which is carried by the slide-head. This pick-up being of well-known construction is not illustrated as to its internal details. It is sufficient to state that it is hollow and is provided with radial pivoted jaws or detents, which are provided with springs 335, that permit said jaws to yield to allow the head of the shell to pass between them and then close on said head. The rise of the slide-head and pick-up pulls the completed shell from the dial-pocket, and on the next descent of the pick-up the shell carried down again by it comes in contact with the head of the next shell to be lifted by the rod 321, and the first shell is therefore pushed up into the tubular column 336, which communicates with the pick-up and rises and falls with it. Successive operations soon fill the columns 336 (see Figs. 1 and 7) and the shells tilt out into a chute 337, carried at the upper end of the column, the back of the chute having a forwardly-slanting finger 338, which causes the shells to tilt properly. They then slide down the chute and fall therefrom into any suitable receptacle.

To effect the automatic stopping of the machine by any of the causes presently explained, I provide the following devices and connections: Referring to Figs. 5 and 6, two properly-insulated spring contact-fingers are shown at 339, supported by a bracket 340, secured to the bed 67. The said fingers project over the pockets in the dial 234 and form normally-separated terminals of an electric circuit, including the magnet 60 (see Fig. 3) and a battery 341 or other source of electricity. The connections are indicated at 342. The operator may stop the machine by pressing the front finger 339 against the rear one, completing the circuit through the magnet 60, attracting the armature 61, releasing the lever 57, which is then moved to the position shown in Fig. 3 by the spring 64, and permitting the automatic unclutching of the driving-pulley and main shaft, as hereinbefore explained.

If the supply of caps to the dials gives out, or if for any reason a cap should fail to be applied to a tube, resulting in the tube being carried around by the dial without being extracted therefrom by the pick-up, or if for any other reason the pick-up fails to extract a tube or shell, the latter will press the fingers 339 together and cause the stoppage of the machine.

If the wadding-paper or the paper shells give out, or if for any reason another than a perfectly-wadded tube is fed to the tube-dial, or if no tube at all drops into a pocket of the dial, the spring-pressed plunger 293 moves down its whole distance because of failing to meet with the obstruction to so moving normally afforded by the wad in a tube. This full downward movement carries with it the arm 295, which is provided at its outer end with a vertical bearing for a slide-rod 343, having a foot 344 at its lower end, (see Fig. 7,) a spring 345 between said foot and the arm 295 normally pressing said rod as far down as may be permitted by a stop-nut 346 screwed on the rod 343 above the arm 295. The arm 295 extends so that the rod 343 is above the two contact-fingers 339, and the foot-piece 344 is adapted to strike the upper edges of said fingers and complete the electrical circuit and cause the stoppage of the machine, if for any reason there is no perfectly-wadded tube to act as a stop to limit the downward movement of said plunger. When a perfectly-wadded tube is pushed from the transferrer-jaws into a pocket of the tube-dial, the wad therein comes to rest on the top of the pin 326 and acts as a stop for the plunger and prevents the foot-piece from completing a circuit, and thus permitting the operation of the machine to continue.

The front bed 67 is vertically adjustable relatively to the rear bed 67$^a$, as hereinbefore mentioned, in order that the tubes which are carried by the feed-shafts may be in exact alinement with the spreading-punch and with the wad-inserters, whatever may be the size of the latter. Of course it will be understood that when shells of different sizes are to be produced by the machine changes must be made in some of the tools—such as punches, dies, inserters, and inserter-sleeves—and adjustments must be made in various parts of the machine. I have not deemed it necessary to specifically describe all the locations where changes or adjustments are made, as most of such are matters relating to mechanical skill; but in regard to the beds 67 and 67$^a$ it seems desirable to state that the drawings (see particularly Figs. 3 and 5) show the rear bed 67$^a$ as rigidly supported on the frame 41 and having a vertical front face, to which the bed 67, somewhat in the form of a bracket, is attached by bolts 347, passing through vertical slots in the vertical wall of said bed 67 into the front face of said bed 67$^a$. The bottom of the casting forming the bed 67 rests on wedges 348, which are adjustable between said casting and the top of the frame 41 by means of screws 349 tapped into the frame 41. When the bolts 347 are loosened, the bed 67 may be adjusted by means of the wedges, and then the bolts are tightened. This provides for obtaining the exact proper feed and location of the tubes in alinement with the spreader and the inserters under all the varying conditions as to the size of the tubes and tools.

Another adjustment which may be more definitely referred to is that of the top plate or presser shown in Fig. 16. The bracket-piece 93 is secured to the block 350 by a bolt 351, passing through a slot in the piece 93 into said block and preferably also through a slotted wedge to permit the height of the piece 93 and the top plate or presser 91 and 92 to be adjusted as well as its longitudinal position.

Another adjustment that should be described is that of the levers 209, so that their detents will accurately stop the coiling-spindles, as hereinbefore mentioned. Referring to Figs. 8 and 9, it will be seen that the blocks 211, to which the levers 209 are pivoted, are mounted to be adjusted toward and from each other by adjusting-screws 352 and held when adjusted by bolts 353.

The operations of the several groups of mechanisms having been explained in connection with the description of the construction thereof and the order and timing of the operations of said mechanisms having been explained, a further or general description of the operation of the machine as a whole is unnecessary.

Having now described my invention, I claim—

1. A machine of the character specified, comprising mechanism for forming and inserting wads in tubes, mechanism for applying caps to the wadded tubes, and an automatic feed between the wadding and capping mechanism, said feed including means for changing the direction and plane of travel of the tubes.

2. A machine of the character specified, comprising mechanism for holding the tubes in horizontal positions and for forming and inserting wads therein while so held, mechanism for applying caps to the wadded tubes, and an automatic feed mechanism between the wadding and capping mechanisms.

3. A machine of the character specified, comprising mechanism for holding the tubes in horizontal positions and means for inserting wads therein while so held, mechanism for changing the tubes to vertical positions, and means for applying caps to the tubes while held vertically.

4. A machine of the character specified, comprising mechanism for holding the tubes in horizontal position and means for forming and inserting wads therein while so held, vertically-movable feed devices for supplying paper to the wadding mechanism, and means for applying caps to the wadded tubes.

5. A machine of the character specified, comprising wad forming and inserting mechanism and means for feeding tubes thereto, means for adjusting the plane of operative movement of the feed relatively to the wadding mechanism, and mechanism for applying caps to the wadded tubes.

6. A machine of the character specified, comprising wad forming and inserting mechanism and means for feeding tubes thereto in a horizontal plane and position, means for adjusting the plane of operative movement of the feed relatively to the wadding mechanism, and mechanism for applying caps to the wadded tubes.

7. A machine of the character specified, comprising wadding mechanism and means for feeding tubes thereto, means for adjusting the plane of operative movement of the feed relatively to the wadding mechanism, mechanism for applying caps to the wadded tubes, and a secondary feed for transferring the tubes from the first-mentioned feed to the capping mechanism.

8. A machine of the character specified, comprising wadding mechanism and means for feeding tubes thereto in a horizontal plane and position, means for adjusting the plane of operative movement of the feed relatively to the wadding mechanism, mechanism for applying caps to the wadded tubes in vertical position, and a secondary feed for transferring the tubes from the first-mentioned feed to the capping mechanism and for turning them from horizontal to vertical position while in transit.

9. A machine of the character specified, comprising means for feeding the tubes in horizontal plane and position, mechanism for inserting wads therein while in such position, a dial having vertical pockets, means for feeding the wadded tubes to said dial, and mechanism for applying caps to the tubes in said pockets.

10. A machine of the character specified, comprising means for feeding the tubes in horizontal plane and position, mechanism for inserting wads therein while in such position, a dial having vertical pockets, means for feeding the wadded tubes to said dial, a dial having cap-pockets, means for supplying caps thereto, and mechanism for transferring the caps from the cap-dial to the tubes in the tube-dial.

11. A machine of the character specified, comprising a tube-spreader, mechanism for inserting wads in the spread ends of the tubes, pinching mechanism for contracting the wadded end of the tube, a cap-spreader, means for applying the spread cap to the pinched end of the tube, and means for closing or reducing the spread end of the cap on the tube.

12. A machine of the character specified, comprising a tube-spreader, mechanism for inserting wads in the spread ends of the tubes, mechanism for feeding and holding the tubes in horizontal positions during the operations of these mechanisms, secondary feed devices for transferring the tubes to vertical positions and moving and holding them in said positions, a cap-spreader, means for applying the spread cap to the pinched end of the tube, and means for closing or reducing the spread end of the cap on the tube.

13. A machine of the character specified, comprising mechanism for inserting wads in the ends of tubes, mechanism for applying caps to said ends, and means for automatically stopping the machine upon the failure of either of said mechanisms to perform its function.

14. A machine of the character specified, comprising mechanism for inserting wads in the ends of tubes, mechanism for applying caps to said ends, mechanism for discharging the shells from the machine, and means for automatically stopping the machine upon the failure of either of said mechanisms to perform its function.

15. A machine of the character specified, comprising a tube-spreader, mechanism for inserting wads in the spread ends of the tubes, pinching mechanism for contracting the wadded end of the tube, a cap-spreader, means for applying the spread cap to the pinched end of the tube, means for closing or reducing the spread end of the cap on the tube, and means for automatically stopping the machine upon the failure of the wadding or capping mechanisms to perform its function.

16. A machine of the character specified, comprising wadding mechanism having adjustable and interchangeable parts for operating on tubes of different sizes, and means for feeding and holding tubes to receive the wads, said feeding and holding mechanism being adjustable relatively to the wadding mechanism and in a plane at a right angle to the line of feed to enable tubes of different sizes that are to be wadded, to be alined with said wadding mechanism.

17. A machine of the character specified, comprising wadding mechanism mounted to operate in a horizontal plane, and having adjustable and interchangeable parts for operating on tubes of different sizes, and means for feeding and holding tubes to receive the wads, said feeding and holding mechanism being vertically adjustable.

18. In a machine of the character specified, the combination with a supply-hopper having an open side, of a vibrator located in said opening and of a length to permit the passage thereunder of one tube at a time, means for oscillating said vibrator toward and from the inside of the hopper to agitate the contents of the latter, wadding mechanism, and means for feeding the tubes horizontally from a point immediately adjacent to and below said vibrator to the wadding mechanism.

19. In a machine of the character specified, the combination with the hopper 66 having an open side, of the rock-shaft 69 above the opening and having the vibrator 68 extending nearly to the bottom of the opening, and having also the arm 71, means for oscillating the said arm to cause the vibrator to agitate the contents of the hopper, wadding mechanism, and means for feeding the tubes horizontally from a point immediately adjacent to and below said vibrator to the wadding mechanism.

20. In a machine of the character specified, the combination with a pair of spirally-grooved shafts, of means for feeding tubes thereto, wadding mechanism, means for imparting an intermittent rotary movement to the shafts to advance the tubes and then hold them in front of the wadding mechanism, and means for holding the tubes firmly during the operation of the wadding mechanism.

21. In a machine of the character specified, the combination with a pair of spirally-grooved shafts, of means for feeding tubes thereto, wadding mechanism, a guide or presser for holding the tubes across the two shafts and in the grooves thereof, and means for imparting an intermittent rotary movement to the shafts to advance the tubes and then hold them in front of the wadding mechanism.

22. In a machine of the character specified, the combination with a pair of spirally-grooved shafts having their grooves extending in opposite directions, of intermeshing pinions fast on said shafts, means for imparting an intermittent rotary movement to the shafts in opposite directions, wadding mechanism, means for feeding tubes to said shafts to be advanced by the latter and held in front of the wadding mechanism, and means for holding the tubes firmly during the operation of the wadding mechanism.

23. In a machine of the character specified, the combination with a pair of spirally-grooved shafts having their grooves extending in opposite directions, of intermeshing pinions fast on said shafts, a gear meshing with one of said pinions, a pawl-and-ratchet mechanism for imparting an intermittent rotary movement to the shafts in opposite directions, wadding mechanism, means for feeding tubes to said shafts to be advanced by the latter and held in front of the wadding mechanism, and means for holding the tubes firmly during the operation of the wadding mechanism.

24. In a machine of the character specified, the combination with a pair of spirally-grooved shafts having their grooves extending in opposite directions, of intermeshing pinions fast on said shafts, a gear meshing with one of said pinions, the hub of said gear being formed with ratchet-teeth 79, an arm 80 mounted loosely on the shaft of the gear and provided with a pawl 81 engaging with the said teeth 79, a crank on the main shaft, and a pitman connecting said crank with the arm 80.

25. In a machine of the character specified, the combination with the shafts 76 having the reversed spiral grooves and provided with intermeshing pinions 77, of the gear 78 meshing with one of said pinions and having means for imparting an intermittent rotary motion thereto, a hopper for feeding tubes to said grooves, and an adjustable presser-plate adapted to hold the tubes in said groove.

26. In a machine of the character specified, the combination with a pair of spirally-grooved shafts, of means for feeding tubes thereto, wadding mechanism, means for imparting an intermittent rotary movement to the shafts, guides for the ends of the tubes on said shafts, and a presser for holding the tubes on said shafts.

27. In a machine of the character specified, the combination with a pair of spirally-grooved shafts, of means for feeding tubes thereto, wadding mechanism, means for imparting an intermittent rotary movement to the shafts, guides for the ends of the tubes one of said guides being adjustable toward and from the other, and a presser for the tubes on said shafts, said presser being adjustable toward and from the shafts.

28. In a machine of the character specified, the combination with a pair of spirally-grooved shafts, of means for feeding tubes thereto, wadding mechanism, means for imparting an intermittent rotary movement to the shafts, the fixed pressure-plate 91 adjustable relatively to the shafts, and the wing or plate 92 hinged to the plate 91.

29. In a machine of the character specified, the combination with a pair of spirally-grooved shafts, of means for feeding tubes thereto, wadding mechanism, means for imparting an intermittent rotary movement to the shafts, the fixed presser-plate 91 adjustable relatively to the shafts, the plate or wing 92 hinged to the plate 91, and the spring 95 hinged to the plate 91 and provided with an end portion bearing on the plate 92 to hold it on the tubes resting on the shafts.

30. In a machine of the character specified, the combination with means for feeding and holding paper tubes, of a spreading-punch comprising a head adapted to enlarge the end of a tube, and means carried by said head to strip the tube therefrom on the return movement of the punch, said means being formed to afford no obstruction to the enlarging action of the spreading-punch.

31. In a machine of the character specified, the combination with means for feeding and holding paper tubes, of the longitudinally-movable rod 99 having the spreading-head 98, the ring 102 mounted on the rod 99 and having lugs 103 projecting through grooves in the head, and a spring yieldingly supporting the ring 102 against backward movement.

32. In a machine of the character specified, the combination with the wadding mechanism, of the shallow cylindrical boxes 112 supported in a substantially edgewise position, each of said boxes having a slot in its cylindrical body, guide-rolls 119 for the paper, said guide-rolls projecting forward from the back of the box on opposite sides of the slot in the body, and a door for said box.

33. In a machine of the character specified, the combination with the wadding mechanism, of the shallow cylindrical boxes 112 supported in a substantially edgewise position, each of said boxes having a slot in its cylindrical body, guide-rolls 119 for the paper, said guide-rolls projecting forward from the back of the box on opposite sides of the slot in the body, and the door 114 having a lug adapted to be engaged by a suitable latch for holding it closed, said door being provided with a slot to enable the diameter of the coil of the paper in the box to be seen.

34. In a machine of the character specified, the combination with the horizontal slide 120, of coiling-spindles, feed devices, and cutting-knives, all operated or controlled by the reciprocations of said slide.

35. In a machine of the character specified, the combination with the bed 67ª of the slide 101 and a spreading-punch operated thereby, the slide 120 and wadding mechanism operated thereby, and means for reciprocating the slide 101 twice to each reciprocation of the slide 120.

36. In a machine of the character specified, the combination with the bed 67ª, of the slide 101 and a spreading-punch operated thereby, the slide 120 and wadding mechanism operated thereby, the main shaft 45, the disk 109 thereon having a cam-groove, the lever 106 connecting said cam-groove and slide 101, the gear 127 on the shaft 45, the gear 125 having the cam-groove 124 and meshing with said gear 127, and the lever 121 connecting the slide with the cam-groove.

37. In a machine of the character specified, the combination with the bed 67ª, of the slide 101 and a spreading-punch operated thereby, the slide 120 and wadding mechanism operated thereby, the main shaft 45, the disk 109 thereon having a cam-groove, the lever 106 connecting said cam-groove and slide 101, the gear 127 on the shaft 45, the gear 125 having the cam-groove 124 and meshing with said gear 127, the said cam-groove being composed principally of a concentric portion and then a slight upward curve followed by a longer inward curve, and the lever 121 connecting the slide with the cam-groove.

38. In a machine of the character specified, the combination with wad-coiling spindles, of knives for severing the paper, feeding devices for supplying the end of the paper to the coilers after cutting, the slide 120 having connections for controlling the movements of said parts, and means for reciprocating said slide.

39. In a machine of the character specified, the combination with wad-coiling spindles, of knives for severing the paper, feeding devices for supplying the end of the paper to the coilers after cutting, and paper-guides above the knives and movable therewith.

40. In a machine of the character specified, the combination with wad-coiling spindles, of the slide 120, a cross-head carried thereby having a roller at each end, slides carrying knives for severing the paper, and levers connected with the last-mentioned slides and having slots provided with angular ends receiving the rollers of the cross-head.

41. In a machine of the character specified, the combination with the slide 120, of the cross-head carried thereby and having the roll 154, a lever operated by said roll, feed devices connected with said lever, and knives operated by said cross-head.

42. In a machine of the character specified, the combination with the slide 120 having a cross-head and a roll, of a lever operated by said roll, feed devices operatively connected with said lever, knives operatively connected with said cross-head, coiling-spindles for the paper advanced by said feed devices, and means for automatically stopping the coiling devices in proper rotary position, said stopping devices being controlled by the movements of said slide.

43. In a machine of the character specified, the combination with the slide 120 and the wad-inserters connected therewith, of the cross-head also connected with the slide, the knives movable toward and from each other, and levers operatively connecting the cross-head and knives.

44. In a machine of the character specified, the combination with the slide 120 and the wad-inserters connected therewith, of coiling-spindles extending through said inserters, the cross-head connected with said slide, knives movable toward and from each other, and levers operatively connecting the cross-head and knives.

45. In a machine of the character specified, the combination with the slide 120 and the wad-inserters connected therewith, of coiling-spindles extending through said inserters, the cross-head connected with said slide and having a roll at each end, knives movable toward and from each other, and the levers 133 connected with the knives and having slots for the rolls of the cross-head, said slots each comprising a straight portion and a portion at an angle thereto.

46. In a machine of the character specified, the combination with the slide 120 and the wad-inserters connected therewith, of the cross-head also connected with the slide, the knives movable toward and from each other, guides connected to reciprocate with said knives, and levers operatively connecting the cross-head and knives.

47. In a machine of the character specified, the combination with the slide 120 and the wad-inserters connected therewith, of coiling-spindles extending through said inserters, the cross-head connected with said slide and having a roll at each end, knives movable toward and from each other, and the levers 133 connected with the knives and having slots for the rolls of the cross-head, said slots each comprising a straight portion, and a portion at an angle thereto, and cam mechanism for imparting to the slide a guide backward and return movement while the rolls are in the angular portions of the slots, and for permitting the said slide to dwell with the said rolls at the intermediate portions of said slots.

48. In a machine of the character specified, the combination with the casting 136, of paper-coiling spindles, knives, and wad-inserters, all carried thereby, and a slide for controlling the movements of said parts.

49. In a machine of the character specified, the combination with the casting 136, of paper-coiling spindles, knives, wad-inserters, and strip-feed devices, all carried by said casting, and a slide for controlling the movements of said parts.

50. In a machine of the character specified, the combination with the slide 120, of the casting 136, wad-inserters, knives and strip-feed devices all carried by said casting and operated by said slide, coiling-spindles also mounted in said casting, and devices operated by said slide for stopping the coiling-spindles in proper position.

51. In a machine of the character specified, the combination with the main slide 120, of the supplemental slide 206 having connections with the main slide whereby it is operated thereby but with a shorter stroke, wad-inserters, knives and strip-feed devices all carried by said casting and operated by the main slide, coiling-spindles also mounted in said casting, and devices operated by the supplemental slide for stopping the coiling-spindles in proper position.

52. In a machine of the character specified, the combination with the coiling-spindles and means for frictionally driving them, of stops carried by said spindles, detents for engaging said stops, and a slide and connections for simultaneously operating said detents.

53. In a machine of the character specified, the combination with the coiling-spindles and means for frictionally driving them, of stops carried by said spindles, levers having detents for engaging said stops, and a slide and connections for simultaneously controlling the positions of the levers and detents.

54. In a machine of the character specified, the combination with the coiling-spindles and means for frictionally driving them, of stops carried by said spindles, levers having detents for engaging said stops, adjustable supports for said levers, and a slide and connections for simultaneously oscillating said levers.

55. In a machine of the character specified, the combination with the coiling-spindles and means for frictionally driving them, of stops carried by said spindles, levers having detents for engaging said stops, a slide having a beveled end for operating the levers in one direction, and springs for operating the levers in the reverse direction.

56. In a machine of the character specified, the combination with a coiling-spindle, of means for feeding a strip of paper thereto, a slotted tube inclosing the end of the coiling-spindle, a knife movable across the slot of said tube, and a guide for the strip above the knife and movable therewith.

57. In a machine of the character specified, the combination with a coiling-spindle, of a slotted tube inclosing its outer end, a knife movable across the slot in the tube, a guide for the strip above the knife and movable therewith, and gripping devices above the knife and movable to feed the strip after the operation of the knife.

58. In a machine of the character specified, the combination with a coiling-spindle, of a knife for severing the strip of paper, a clamp for frictionally holding the strip, and positive feed devices between said clamp and knife.

59. In a machine of the character specified, the combination with a coiling-spindle, of a knife for severing the strip of paper, a clamp for frictionally holding the strip, said clamp comprising a wear plate or bar and a presser yieldingly held against it, and positive feed devices between said clamp and knife.

60. In a machine of the character specified, the combination with a coiling-spindle, of a slotted tube inclosing its outer end, a knife movable across the slot in the tube, a guide for the strip above the knife and movable therewith, a friction-clamp comprising a wear plate or bar and a presser yieldingly held against it, and gripping devices above the knife and movable to feed the strip after the operation of the knife.

61. In a machine of the character specified, the combination with a coiling-spindle and a knife for severing the strip of paper, of a feed device for said strip comprising a block mounted to reciprocate toward and from the knife and a clamp movable in the same direction and also toward and from the block.

62. In a machine of the character specified, the combination with a coiling-spindle and a knife for severing the strip of paper, of a feed device for said strip comprising a block having a two-motion feed movement and a clamp to coöperate therewith and having a four-motion feed movement.

63. In a machine of the character specified, the combination with the coiling devices and knives, of the slide 156 having clamping devices, the supplemental slide 159 mounted in ways in the slide 156 and having means for positively operating the clamping devices, and means for reciprocating the slide 159 and causing it to operate the clamps and to reciprocate the slide 156.

64. In a machine of the character specified, the combination with the coiling devices and knives, of the slide 156 having clamping devices, the supplemental slide 159 mounted in ways in the slide 156 and having cam-surfaces 161 adapted to engage the clamping devices, and means for reciprocating the slide 159 to cause the said cam-surfaces to act on the clamps to close them and then move the slide 156 through the medium of said clamps.

65. In a machine of the character specified, the combination with the casting 136, of the slide 156 carrying clamping devices, the slide 159 having means for operating the clamps and mounted to reciprocate on the slide 156, the lever 148 directly connected with the slide 159, and means for operating said lever.

66. In a machine of the character specified, the combination with the casting 136, of the slide 156 carrying clamping devices, the slide 159 having means for operating the clamps and mounted to reciprocate on the slide 156, the lever 148 directly connected with the slide 159, the lever 151 having the bearing-surface 152 and toe or cam 153 and connected with the lever 148, and the slide 120 having a roll engaging the bearing-surface and cam of the lever 151.

67. In a machine of the character specified, the combination with the coiling-spindle having a driving-pinion loosely connected therewith, of means for frictionally connecting the spindle and pinion.

68. In a machine of the character specified, the combination with the coiling-spindle having a driving-pinion loosely connected therewith, of means for frictionally connecting the spindle and pinion, and means for adjusting the friction between said parts.

69. In a machine of the character specified, the combination with the coiling-spindle having a driving-pinion loosely connected therewith, of means for frictionally connecting the spindle and pinion, and means for automatically stopping the spindle in a predetermined position.

70. In a machine of the character specified, the combination with the coiling-spindle, of the sleeve 189 rigidly connected therewith and having a hub 194 provided with an annular groove, the driving-pinion 191 loosely mounted on the sleeve and having the ring 193 fitting the groove in the hub, and means for yieldingly holding the ring in said groove.

71. In a machine of the character specified, the combination with the coiling-spindle, of the sleeve 189 rigidly connected therewith and having a hub 194 provided with an annular groove in one side and with peripheral stops, the driving-pinion 191 loosely mounted on the sleeve and having the ring 193 fitting the groove in the hub, means for yieldingly holding the ring in said groove, and detents for the stops on said hub.

72. In a machine of the character specified, the combination with the coiling-spindle, of the sleeve 189 rigidly connected therewith and having a hub 194 provided with an annular groove, the driving-pinion 191 loosely mounted on the sleeve and having the ring 193 fitting the groove in the hub, the friction-disks 199 bearing on the opposite side of the pinion, and means for yieldingly pressing said disks against the pinion.

73. In a machine of the character specified, the combination with the coiling-spindle, of the sleeve 189 rigidly connected therewith and having a hub 194 provided with an annular groove, the driving-pinion 191 loosely mounted on the sleeve and having the ring 193 fitting the groove in the hub, the friction-disks 199 bearing on the opposite side of the pinion, the rod 195 in the sleeve and extending through the end thereof and held against rotation therein, the spring 197 exerting an inward pressure on said rod, and the friction-disks 199 on the end of said rod and bearing against the pinion.

74. In a machine of the character specified, the combination with the coiling-spindles each having a driving-pinion loosely connected therewith and a friction-hub coöperating with the pinion and having peripheral stops 201, of the levers 209 having detent-blocks 212, the springs 213 normally actuating the blocks 212 toward the periphery of the said hub, and means for operating the levers in the opposite direction.

75. In a machine of the character specified, the combination with the coiling-spindles each having a driving-pinion loosely connected therewith and a friction-hub coöperating with the pinion and having peripheral stops 201, of the levers 209 having detent-blocks 212, the springs 213 normally actuating the blocks 212 toward the periphery of the said hub, the slide 206 having a beveled end adapted to engage said levers, and means for actuating said slide.

76. In a machine of the character specified, the combination with means for feeding the tubes in a horizontal plane and position and mechanism for inserting wads in said tubes while in said position, of the chute 215 for receiving the wadded tubes, said chute being formed to change the position of each tube to the vertical capping mechanism, and means for transferring the tubes thereto from the bottom of the chute.

77. In a machine of the character specified, the combination with means for feeding the tubes in a horizontal plane and position and mechanism for inserting wads in said tubes while in said position, of the chute 215 for receiving the wadded tubes, a stop above the chute at one side thereof to temporarily hold one end of each tube, capping mechanism, and means for transferring the tubes thereto from the bottom of the chute.

78. In a machine of the character specified, the combination with means for feeding the tubes in a horizontal plane and position and mechanism for inserting wads in said tubes while in said position, of the chute 215 for receiving the wadded tubes, a stop above the chute at one side thereof to temporarily hold one end of each tube, a removable wall or plate 218 in the other side of the chute, capping mechanism, and means for transferring the tubes thereto from the bottom of the chute.

79. In a machine of the character specified, the combination with the spirally-grooved shafts 76, one of which has an extended spindle 217, of the chute 215 for receiving tubes fed by said shafts, said chute being adapted to discharge the tubes endwise, capping mechanism, and means for delivering the tubes thereto from the chute.

80. In a machine of the character specified, the combination with wadding mechanism, of a chute for receiving the wadded tubes, feed devices between said wadding mechanism and chute, spring-operated jaws for receiving the tubes from the chute, means for preventing backward movement of the tubes while between the jaws capping mechanism, and means for reciprocating the jaws to deliver the tubes one by one to the capping mechanism.

81. In a machine of the character specified, the combination with wadding mechanism and capping mechanism, of an intermediate stop or shelf on which the tubes are singly deposited, a slide 222 and means for reciprocating it, feed devices between said wadding mechanism and chute, spring-operated jaws 220 having inward-curved portions 229, means for preventing backward movement of the tubes while between the jaws, and means for removing the tubes from said jaws and carrying them to the capping mechanism.

82. In a machine of the character specified, the combination with wadding mechanism and capping mechanism, of an intermediate stop or shelf on which the tubes are singly deposited, a slide 222 and means for reciprocating it, feed devices between said wadding mechanism and chute, jaws 220 pivoted to said slide and having inward-curved portions 229 and the spring 227 for normally closing the jaws, and means for preventing backward movement of the tubes while between the jaws.

83. In a machine of the character specified, the combination with the chute 215, of the stop or shelf 219 below it, the back wall or stop 228 for a tube resting on said shelf, the slide 222 and means for operating it, and the spring-operated jaws 220 carried by said slide and having inward-curved portions 229 to ride over a tube resting on said shelf.

84. In a machine of the character specified, the combination with the tube-dial and the cap-dial, each having ratchet-teeth, of the slide 241 and means for reciprocating it, and two pawls carried by said slide, one pawl for each ratchet, said slide being mounted to reciprocate in a direction substantially at a right angle to a line intersecting the centers of the two dials.

85. In a machine of the character specified, the combination with the tube-dial having pockets, of a chute for depositing tubes singly in vertical position adjacent to the top of the dial, transferrer-arms for moving each tube over a pocket in the dial, and means for pushing the tube from said arms into a pocket.

86. In a machine of the character specified, the combination with the tube and cap dials each having pockets, of chutes for supplying tubes and caps singly and separately in vertical position over the pockets, and means for simultaneously depressing the cap and tube into their respective pockets.

87. The combination with a hopper having an inclined bottom and an outlet from the lower portion thereof, of a feed-disk mounted on a substantially horizontal axis and having an inclined periphery and provided with radial slots having parallel sides whereby cylindrical-headed articles such as cartridge-shells may be accurately received in the slots between said parallel sides with their heads beyond the ends of said slots, and means for rotating the disk.

88. The combination with a hopper having an inclined bottom, of a feed-disk mounted on a substantially horizontal axis and having an inclined periphery and provided with radial slots having parallel sides whereby cylindrical-headed articles such as cartridge-shells may be accurately received in the slots between said parallel sides with their heads beyond the ends of said slots, the said periphery being at a slight distance from the walls of the hopper adjacent thereto, means for rotating the disk, and a chute leading from the hopper on the outer side of the disk.

89. In a machine of the character specified, the combination with the cone-shaped hopper 253, of the disk 268 mounted to rotate therein and having radial slots 269 with parallel sides whereby cylindrical-headed articles such as cartridge-shells may be accurately received in the slots between said parallel sides with their heads beyond the ends of said slots, a chute leading from the hopper on the outer side of the disk, and means for rotating the disk by hand.

90. In a machine of the character specified, the combination with the cone-shaped hopper 253, of the disk 268 mounted to rotate therein and having radial slots 269 with parallel sides whereby cylindrical-headed articles such as cartridge-shells may be accurately received in the slots between said parallel sides with their heads beyond the ends of said slots, a chute leading from the hopper on the outer side of the disk, a sprocket-wheel frictionally connected with the disk, a sprocket-chain on said wheel, means for driving said chain, and means for rotating the disk by hand.

91. In a machine of the character specified, the combination with the cone-shaped hopper 253, of the horizontal shaft 256 therein and having the disk 268, the periphery of said disk being parallel with the inner walls of the large end of the hopper and at a slight distance therefrom, and divided by a series of radial slots having parallel sides whereby cylindrical-headed articles such as cartridge-shells may be accurately received in the slots between said parallel sides with their heads beyond the ends of said slots, means for rotating the shaft, and a chute leading from the hopper on the outer side of the disk.

92. In a machine of the character specified, the combination with the cone-shaped hopper 253, of the horizontal shaft 256 therein and having the disk 268, the periphery of said disk being parallel with the inner walls of the large end of the hopper and at a slight distance therefrom and divided by a series of radial slots having parallel sides whereby cylindrical-headed articles such as cartridge-shells may be accurately received in the slots between said parallel sides with their heads beyond the ends of said slots, the end of the shaft extending through the end of the hopper and having a disk secured thereto, a sprocket-wheel loosely mounted on the shaft, a friction-disk between the sprocket and fixed disk, and a driving-chain for the sprocket.

93. In a machine of the character specified, the combination with wadding mechanism and a cap-spreader, of a dial having pockets for the wadded tubes, means for applying the caps to the tubes in the pockets, annular contracting-dies in said pockets, and means for forcing the capped tubes lengthwise in the pockets to cause the said dies to reduce the spread ends of the caps.

94. In a machine of the character specified, the combination with wadding mechanism and a cap-spreader, of a dial having pockets for the wadded tubes, means for applying the caps to the tubes in the pockets, annular contracting-dies in said pockets, means for forcing the capped tubes downward in the pockets to cause the said dies to reduce the spread ends of the caps, means for then elevating the capped tubes, and means for picking the said tubes from the dial.

95. In a machine of the character specified, the combination with the dial mechanism, of the lever 301, the punch 300 adjustably connected therewith and having a lost-motion connection therewith, the arm 320 of said lever, and the lift-rod 321 connected with said arm.

96. In a machine of the character specified, the combination with the lever 301 having the arm 320, the lift-rod 321 connected with said arm, the sleeve 313 operatively connected with the main end of said lever, the sleeve 307 within the sleeve 313 and having a flange 308, and the punch-rod 306 having a screw-thread connection with the sleeve 307.

97. In a machine of the character specified, the combination with a cap-spreading punch, of a dial having vertical pockets, means for applying the spread caps to tubes in said pockets, the said pockets each having an annular upper tapering bushing and an annular contracting-die below it, and means for moving the capped tubes lengthwise in said pockets.

98. In a machine of the character specified, the dial 234 having pockets provided with internal bushings, the upper bushing in each pocket being internally tapered, and the one below it being slightly smaller and having a rounded upper edge, whereby the flared edge of a cartridge-cap may be compressed upon a tube without acting upon the upper portions of said cap.

99. In a machine of the character specified, the combination with wadding and capping mechanism, of a clutch on the main shaft, an electromagnet for permitting the disconnection of the clutch, and normally-separated terminals of the electric circuit, said terminals being located adjacent to the carrier for the wadded tubes and in the path of movement of a portion of a shell which fails to be removed from said carrier.

100. In a machine of the character specified, the combination with wadding mechanism, of a yielding punch movable into the wadded ends of the tubes one by one, electromagnetic devices for effecting the stoppage of the machine, normally-separated terminals of the electric circuit, and a contact-piece carried by said punch and adapted to complete the circuit if the punch fails to encounter a properly-wadded tube.

101. In a machine of the character specified, the combination with wadding mechanism, of a yielding punch movable into the wadded ends of the tubes, one by one, electromagnetic devices for effecting the stoppage of the machine, normally-separated terminals of the electric circuit, an arm connected with said punch and having a contact or foot piece yieldingly carried thereby and adapted to connect the said separated terminals upon the complete descent of the punch.

102. In a machine of the character specified, the combination with wadding and capping mechanism, the latter including a tube or shell dial, of electromagnetic devices for effecting the stoppage of the machine, normally-separated terminals of the electric circuit, said terminals extending over the dial, and means for removing shells from said dial before they reach said terminals.

103. In a machine of the character specified, the combination with the dial 234 having pockets, of means for removing shells therefrom, wadding mechanism, the spring-mounted punch 293 for pushing wadded tubes into the pockets, an arm from said punch having a switch or contact-piece, electromagnetic devices for effecting the stoppage of the machine, and the normally-separated terminals 339 of the electric circuit extending over the pockets of the dial and below said switch or contact-piece.

104. The combination with a hopper having an inclined bottom and an outlet from the lower portion thereof, of a feed-disk mounted on a substantially horizontal axis and having an inclined periphery and provided with radial slots having parallel sides whereby cylindrical-headed articles such as cartridge-shells may be accurately received in the slots between said parallel sides with their heads beyond the ends of said slots, means for rotating the disk, and a chute leading from the outlet of the hopper, said chute having a side opening for the overflow of caps when the chute is full.

In testimony whereof I affix my signature in presence of two witnesses.

HOBERT J. HURD.

Witnesses:
A. M. WOOSTER,
N. ELWOOD.